United States Patent
Yokomori

(10) Patent No.: US 7,267,391 B2
(45) Date of Patent: Sep. 11, 2007

(54) METHOD OF CONTROLLING POWER SLIDE DEVICE FOR SLIDING VEHICLE SLIDE DOOR

(75) Inventor: Kazuhito Yokomori, Yamanashi-ken (JP)

(73) Assignee: Mitsui Kinzoku Kogyo Kabushiki Kaisha, Tokyo (JP)

( * ) Notice: Subject to any disclaimer, the term of this patent is extended or adjusted under 35 U.S.C. 154(b) by 55 days.

(21) Appl. No.: 10/492,086

(22) PCT Filed: Oct. 11, 2002

(86) PCT No.: PCT/JP02/10597

§ 371 (c)(1),
(2), (4) Date: Mar. 2, 2005

(87) PCT Pub. No.: WO03/033287

PCT Pub. Date: Apr. 24, 2003

(65) Prior Publication Data

US 2005/0161973 A1 Jul. 28, 2005

(30) Foreign Application Priority Data

Oct. 11, 2001 (JP) ............................. 2001-313735
Oct. 11, 2001 (JP) ............................. 2001-313736
Oct. 11, 2001 (JP) ............................. 2001-313737

(51) Int. Cl.
*B60J 5/06* (2006.01)

(52) U.S. Cl. ..................................... 296/155

(58) Field of Classification Search ............... 296/155, 296/146.4, 146.1; 49/360; 188/2 R, 2 D, 188/266.1, 163
See application file for complete search history.

(56) References Cited

U.S. PATENT DOCUMENTS

| | | | | |
|---|---|---|---|---|
| 5,618,068 A | * | 4/1997 | Mitsui et al. ................ 292/201 |
| 5,833,301 A | * | 11/1998 | Watanabe et al. ............ 296/155 |
| 5,913,563 A | * | 6/1999 | Watanabe et al. ............ 296/155 |
| 6,089,649 A | * | 7/2000 | Hamada et al. .............. 296/155 |
| 6,183,040 B1 | * | 2/2001 | Imaizumi et al. ............ 296/155 |
| 6,198,242 B1 | * | 3/2001 | Yokomori et al. ........... 318/445 |
| 6,359,762 B1 | * | 3/2002 | Yokomori ...................... 361/51 |
| 6,618,997 B2 | * | 9/2003 | Yokomori ...................... 49/506 |
| 6,863,336 B2 | * | 3/2005 | Yokomori et al. ........... 296/155 |
| 6,877,280 B2 | * | 4/2005 | Yokomori ...................... 49/506 |
| 6,925,942 B2 | * | 8/2005 | Yokomori ..................... 105/332 |
| 7,093,887 B2 | * | 8/2006 | Mrkovic et al. ............. 296/155 |
| 2004/0123525 A1 | * | 7/2004 | Suzuki et al. ................. 49/360 |
| 2005/0150167 A1 | * | 7/2005 | Yokomori ...................... 49/360 |
| 2006/0137250 A1 | * | 6/2006 | Imai et al. ..................... 49/360 |
| 2006/0137251 A1 | * | 6/2006 | Imai et al. ..................... 49/360 |

FOREIGN PATENT DOCUMENTS

| | | | |
|---|---|---|---|
| JP | 11166364 | * | 6/1999 |
| JP | 11301271 | * | 11/1999 |
| JP | 2000038876 | * | 2/2000 |
| JP | 2000179232 | * | 6/2000 |

* cited by examiner

*Primary Examiner*—H. Gutman
(74) *Attorney, Agent, or Firm*—Browdy and Neimark PLLC

(57) ABSTRACT

In the present control method of a powered sliding device, a sliding movement of the sliding door in the closing direction by an external force is monitored after the sliding door is slid in the opening direction by the motive power of the motor to reach the opening end position and the sliding movement by the motor is terminated. A brake is applied to the sliding door for a predetermined time when the sliding movement of the sliding door in the closing direction at a speed higher than a predetermined speed is detected within a predetermined time. After that, the brake is applied to the sliding door again for a predetermined time when the sliding movement of the sliding door in the closing direction at a speed higher than a predetermined speed is detected again within a predetermined time.

9 Claims, 13 Drawing Sheets

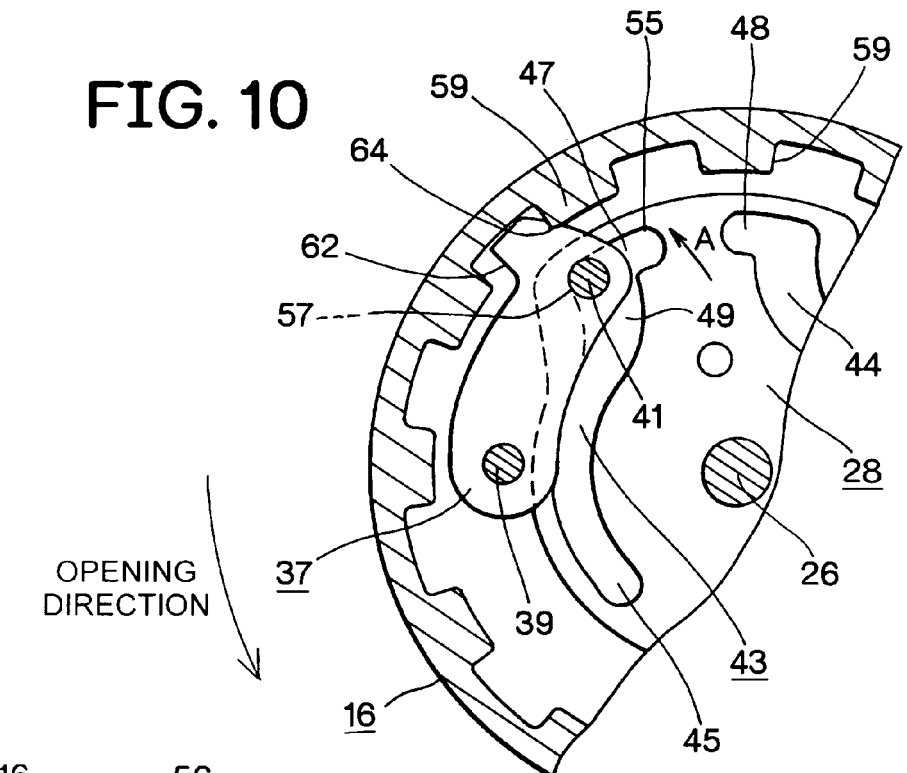
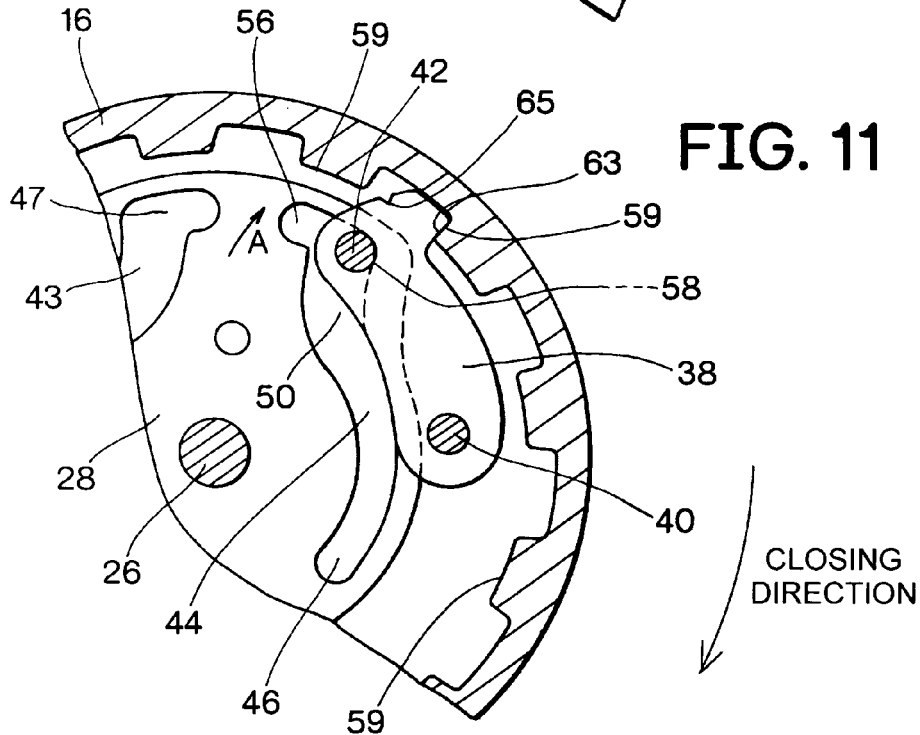

METHOD OF CONTROLLING POWER SLIDE DEVICE FOR SLIDING VEHICLE SLIDE DOOR

TECHNICAL FIELD OF THE INVENTION

The present invention relates to a method of controlling a powered sliding device for sliding a vehicle sliding door.

BACKGROUND ART OF THE INVENTION

There is a conventionally known powered sliding device for a vehicle sliding door for sliding the sliding door in a door-opening direction and a door-closing direction by rotating a wire drum coupled to the sliding door through a wire cable by motive power of a motor, the sliding door which has been moved to a door-open position by the sliding device is retained in the open position by a door holder.

As the door holder, there are a mechanically engaging holder using a latch/ratchet mechanism and a striker and a climbing-over holder using an elastic ridge such as a leaf spring or a non-elastic ridge. In a case of the climbing-over holder, if the sliding door is slid in the opening direction, the sliding door comes into contact with the door holder, climbs over the door holder against climbing-over resistance of the door holder, reaches the open position, and then is retained in the open position by the climbing-over resistance of the door holder. A door retaining force of the climbing-over holder is equal to an intensity of the climbing-over resistance and generally set at such an intensity as to be able to retain the sliding door in the open position even when a vehicle body is inclined about 15 degrees. The door retaining force stronger than this is believed to impair operability in sliding the sliding door.

The open-position is set between a mechanical door-opening end position of the sliding door and a climbing-over position of the door holder and has a width of about 20 mm to 40 mm.

There are some problems in the powered sliding device using the climbing-over holder.

The first problem is that play of about 20 mm to 40 mm of the open position adversely affects the retaining force of the door holder which is set to be able to bear the inclination of about 15 degrees. In general, when the sliding door climbs over the door holder and moves to the door-opening end position by motive power of the powered sliding device, the sliding door is released from the sliding device. At this time, if the vehicle body is in a nose-down inclined state, the sliding door gradually slides a distance of the play of 20 mm to 40 mm in the closing direction under influence of the inclination and comes into contact with the door holder while having an inertial force in the closing direction. The sliding door having the inertial force may climb over the door holder and get out of the open position in some cases even when the inclination of the vehicle body is smaller than 15 degrees.

There is a powered sliding device for solving this problem as proposed in Japanese Patent Application Laid-open No. 11-301271. In this powered sliding device, a weak breaking force is applied to the sliding door for a while after the sliding door has been moved to the door-opening end position by motive power to thereby prevent application of a strong inertial force to the sliding door.

In this powered sliding device, however, the sliding door is intermittently coupled to a motor by repeatedly turning on and off an electromagnetic clutch to thereby apply the weak braking force to the sliding door. Therefore, even after the sliding door has been moved to the door-opening end position, it is impossible to manually move the sliding door for a while. Moreover, because the braking force is applied to the sliding door irrespective of the inclined state of the vehicle body, a user sometimes feels a sense of discomfort. In other words, the sliding door does not move irrespective of presence or absence of the braking force when the vehicle body is not inclined and this sliding door which does not move strongly impresses the user with completion of door opening operation. Therefore, the user may be given an illusion that the door can be closed manually before completion of the braking operation.

The second problem in the climbing-over door holder is that the door holder has a property of increasing a sliding speed of the sliding door in addition to a property of reducing the sliding speed. In other words, the door holder functions as resistance to movement of the sliding door until the sliding door passes a center of the door holder while the door holder pushes the sliding door out after the sliding door has passed the center of the door holder. Therefore, the sliding door may slide at an unexpectedly high speed in closing the sliding door by manual operation. This phenomenon becomes more pronounced when the vehicle body is in the nose-down inclined state.

Moreover, the property of pushing out the sliding door adversely affects the sliding movement of the sliding door even in closing the sliding door with the motive power of the motor, it is difficult to make the sliding speed constant, and smoothness of the sliding movement is significantly impaired especially when the vehicle body is in the nose-down inclined state.

The third problem in the climbing-over door holder is that the sliding door climbs over the door holder from the open position and moves in the closing direction if an external force greater than the retaining force of the door holder acts on the sliding door. Most of such external forces are applied by the manual operation by the user, but the external force may act on the sliding door due to vehicle braking operation during running of an automobile. The external force applied by the braking operation is unexpectedly large. At a vehicle speed as low as 3 km/h, the sliding door may climb over the door holder from the open position and close due to the external force applied by the braking operation in some cases. Therefore, it is necessary to pay close attention to move the vehicle when the sliding door is open.

SUMMARY OF THE INVENTION

Therefore, it is an object of the present invention to provide a sliding control method with which unnecessary restriction of sliding of a sliding door can be cancelled early by applying a braking force to the sliding door only when it is required.

It is another object of the invention to provide a sliding control method which prevents a sliding speed of the sliding door from becoming too high when the sliding door is slid from an open position in a closing direction by manual operation with a vehicle body in a nose-down inclined state.

It is another object of the invention to provide a sliding control method which allows the sliding door to slide smoothly when the sliding door is slid from the open position in the closing direction with motive power of a motor with the vehicle body in the nose-down inclined state.

It is another object of the invention to provide a sliding control method which prevents an undesired sliding movement of the sliding door when an external force in the closing direction is applied to the sliding door by braking operation of a vehicle.

BRIEF DESCRIPTION OF THE DRAWINGS

FIG. 10 is a vertical sectional view of a second brake state of the clutch mechanism;

FIG. 11 is a vertical sectional view of a state in which the wire drum is rotated in an opening direction from the first brake state in FIG. 9;

BEST MODE FOR CARRYING OUT THE INVENTION

An embodiment of the present invention will be described by using the drawings. A mechanical structure of a powered sliding device 10 of the invention shown in FIGS. 1 to 12 is the same as a mechanical structure which has already been proposed by the applicant of the present application (see Japanese Patent Application Laid-open No. 2002-201858, US2002/0088180A1, GB2371333A, and DE10164363A1).

Figure 1:
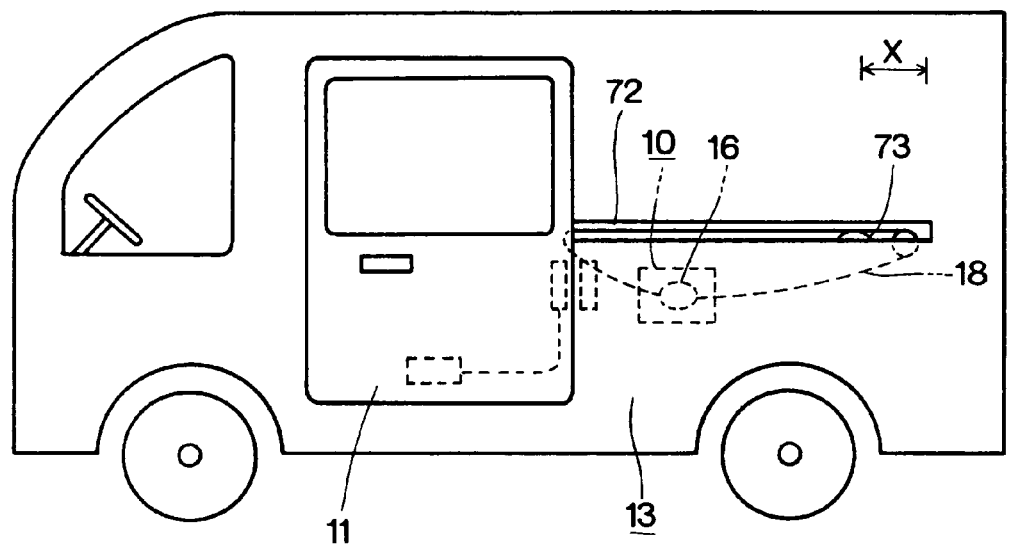
FIG. 1 is a side view of a vehicle including a powered sliding device and a sliding door.
Figure 2:
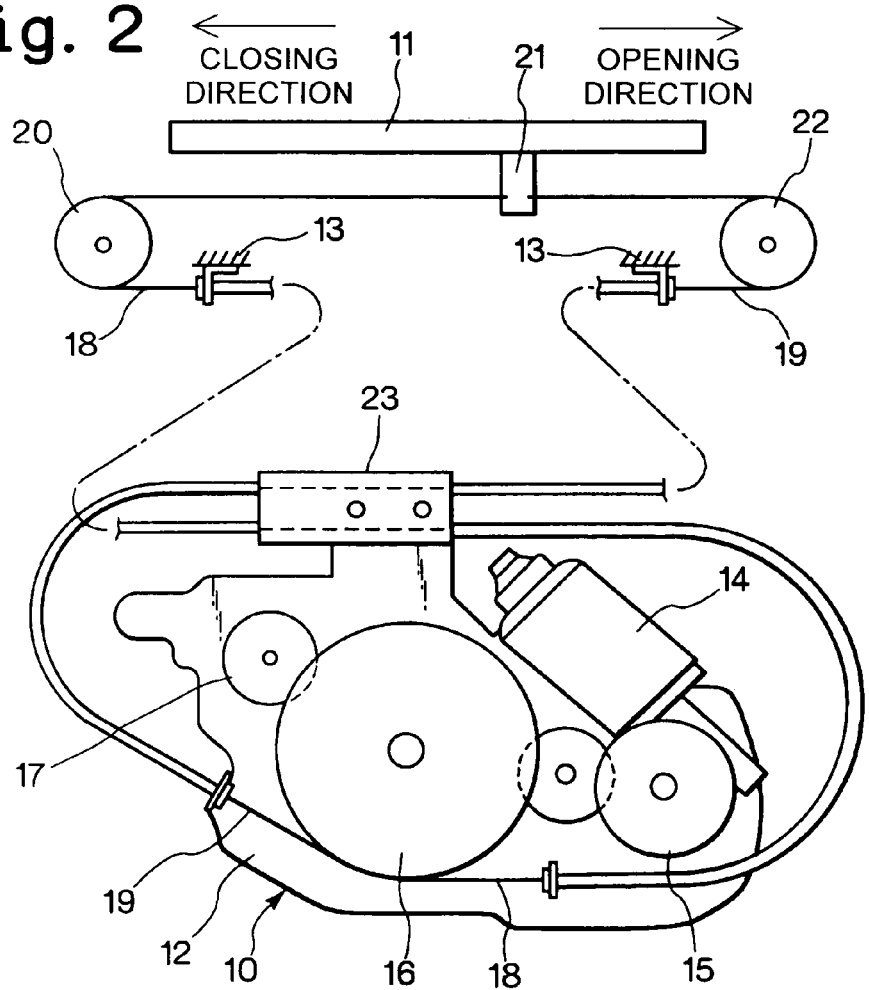
FIG. 2 is a developed view of the sliding device and the sliding door.

FIG. 1 shows a schematic relation between a powered sliding device 10 according to the present invention and a vehicle sliding door 11 which is slidable in a closing direction and an opening direction by the powered sliding device 10. FIG. 2 shows a relation that the both of them are developed. The powered sliding device 10 has a motor 14, a reduction mechanism 15, a wire drum 16 and an auxiliary brake 17, and they are mounted on a base plate 12 fixed on a vehicle body 13. The auxiliary brake 17 has an electric control part such as a solenoid or the like. The auxiliary brake 17 applies the rotation resistance to the wire drum 16 when actuated.

One end sides of two wire cables 18 and 19 are coupled to the wire drum 16. Other end side of the first cable 18 is coupled to a bracket 21 of the sliding door 11 via a front side pulley 20 which is attached to the vehicle body 13. Similarly, other end side of the second cable 19 is coupled to the bracket 21 via a rear side pulley 22 attached to the vehicle body 13. When the wire drum 16 is rotated clockwise, the first cable is rewound as well as the second wire cable 19 is derived, so that the sliding door 11 is slid in the closing direction. When the wire drum 16 is rotated counterclockwise, the sliding door 11 is slid in the opening direction.

A tension case 23 with tension springs (not shown) is fixed on the base plate 12 by screws, and a predetermined tension is applied to each of the cables 18 and 19.

As shown in FIG. 1, a door holder 73 for retaining the sliding door 11 in an open position is mounted to a guide rail 72 of the vehicle body 13. The door holder 73 in the embodiment is a retaining holder having an elastic ridge formed of a bent leaf spring or made of elastic rubber or a mere non-elastic ridge which is passed over when door 11 is opened. If the sliding door 11 is slid in the opening direction, the sliding door 11 passes or climbs over the door holder 73, reaches the open position, then reaches a door-opening end position which is a mechanical limit position to which the sliding door 11 can be slid in the opening direction, and then is retained in the open position by the resistance of the door holder 73. The door holder 73 is provided in a position displaced by a predetermined distance X of about 20 mm to 40 mm in the closing direction from the door-opening end position and therefore the open position conceptually has a width corresponding to this distance. A retaining force of the door holder 73 is normally set at such strength as to be able to retain the sliding door 11 in the open position even if the vehicle body is inclined about 15 degrees. The door holder 73 may be provided to the sliding door 11 in some cases.

Figure 3:
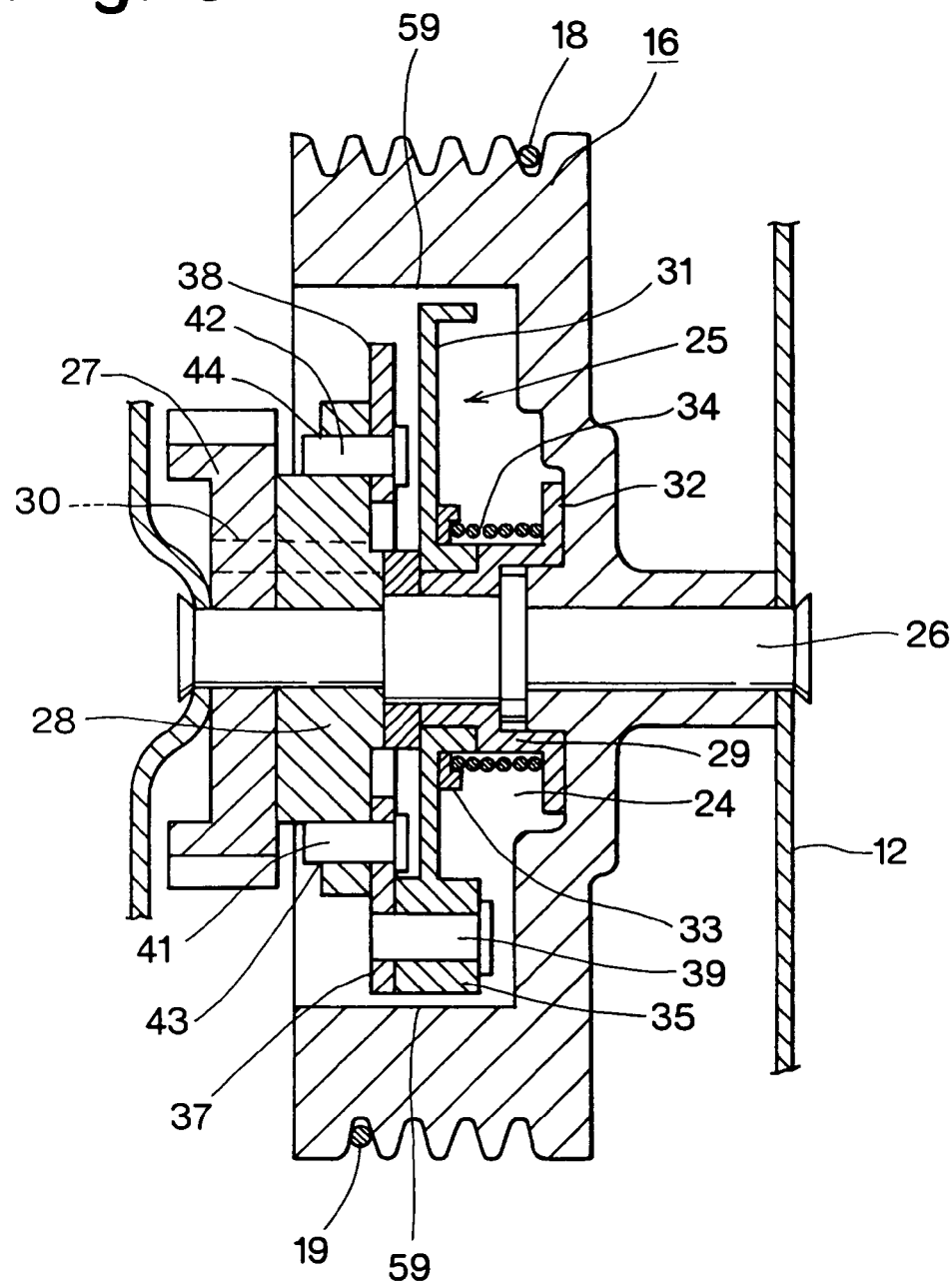
FIG. 3 is a vertical sectional view of the sliding device.

As shown in FIG. 3, a clutch mechanism 25 is substantially stored in a relatively large inside space 24 of the wire drum 16. The clutch mechanism 25 has a first coupled state for transmitting the closing rotation of the motor 14 to the wire drum 16, a second coupled state for transmitting the opening rotation of the motor 14 to the wire drum 16, a first brake state for transmitting the closing rotation of the wire drum 16 to the motor 14, a second brake state for transmitting the opening rotation of the wire drum 16 to the motor 14 and an uncoupled state for transmitting neither the closing rotation nor the opening rotation of the wire drum 16 to the motor 14.

To a drum shaft 26 of the wire drum 16, an output gear 27, a motor plate 28, and a sleeve 29 are respectively and rotatably attached. The output gear 27 is coupled to the motor 14 via the reduction mechanism 15. The motor gear 27 and the motor plate 28 are integrally coupled to each other by a coupling pin 30. Therefore, only the motor plate 28 is shown as a final member of the motor 14 in FIG. 4 and the figures similar to FIG. 4 for simplifying the figures. A disk-like clutch plate 31 is rotatably attached to an outer periphery of the sleeve 29. A friction spring 34 is provided between the clutch plate 31 and a flange 32 of the sleeve 29 via a receiver plate 33. The friction spring 34 applies a low rotational resistance to the clutch plate 31.

Figure 4:
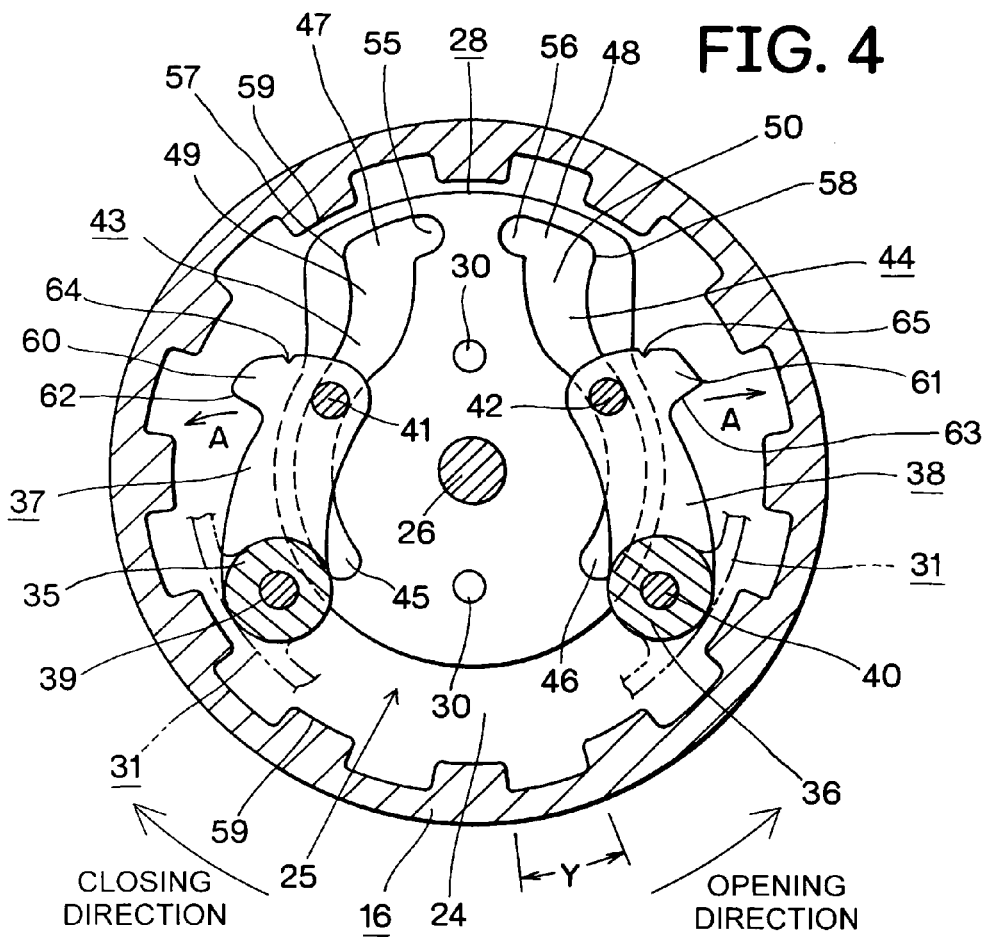
FIG. 4 is a vertical sectional view of an uncoupled state of a clutch mechanism of the sliding device.

The clutch plate 31 has, at portions of an outer peripheral portion thereof, boss portions 35, 36 which are shown by the cross section in FIG. 4 and to which clutch arms 37, 38 are rotatably attached by arm shafts 39, 40, respectively. The clutch arms 37, 38 respectively have, on tip ends thereof, slide pins 41, 42 which are slidably engaged with guide slots 43, 44 formed in the motor plate 28, respectively.

Figure 5:
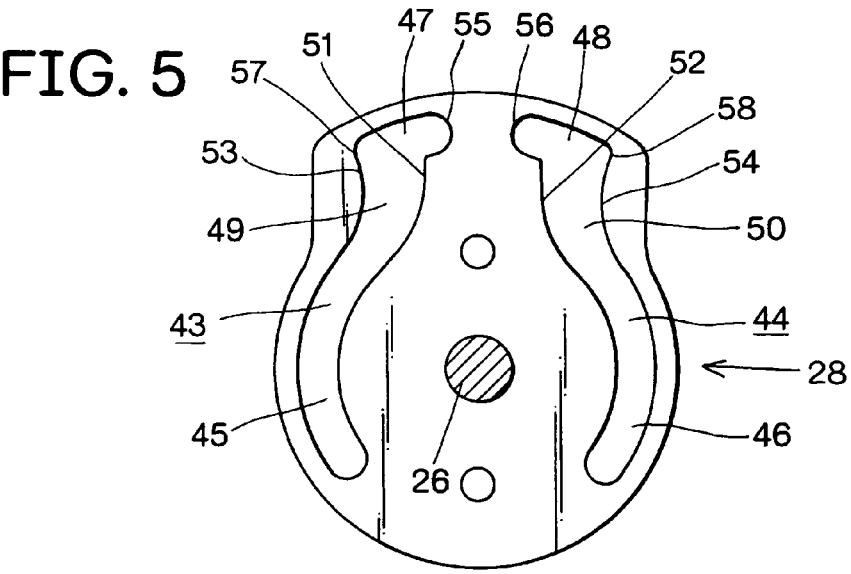
FIG. 5 is a front view of a motor plate of the clutch mechanism.

The guide slots 43, 44 are bilaterally symmetrical as shown in FIG. 5. The guide slots 43, 44 respectively comprise circular arc inner slots 45, 46 around the drum shaft 26, circular arc outer slots 47, 48 around the drum shaft 26, and communication slots 49, 50 connecting the inner slots 45, 46 and the outer slots 47, 48. Each of gaps between inside walls 51, 52 and outside walls 53, 54 of the communication slots 49, 50 is expanded as it is apart from the drum shaft 26. Semicircular engaging portions 55, 56 are respectively formed at one end portions of both the outer slots 47, 48. The other end portions of the outer slots 47, 48 are respectively formed into contact faces 57, 58 which are contiguous and flush with the outside walls 53, 54.

Figure 6:
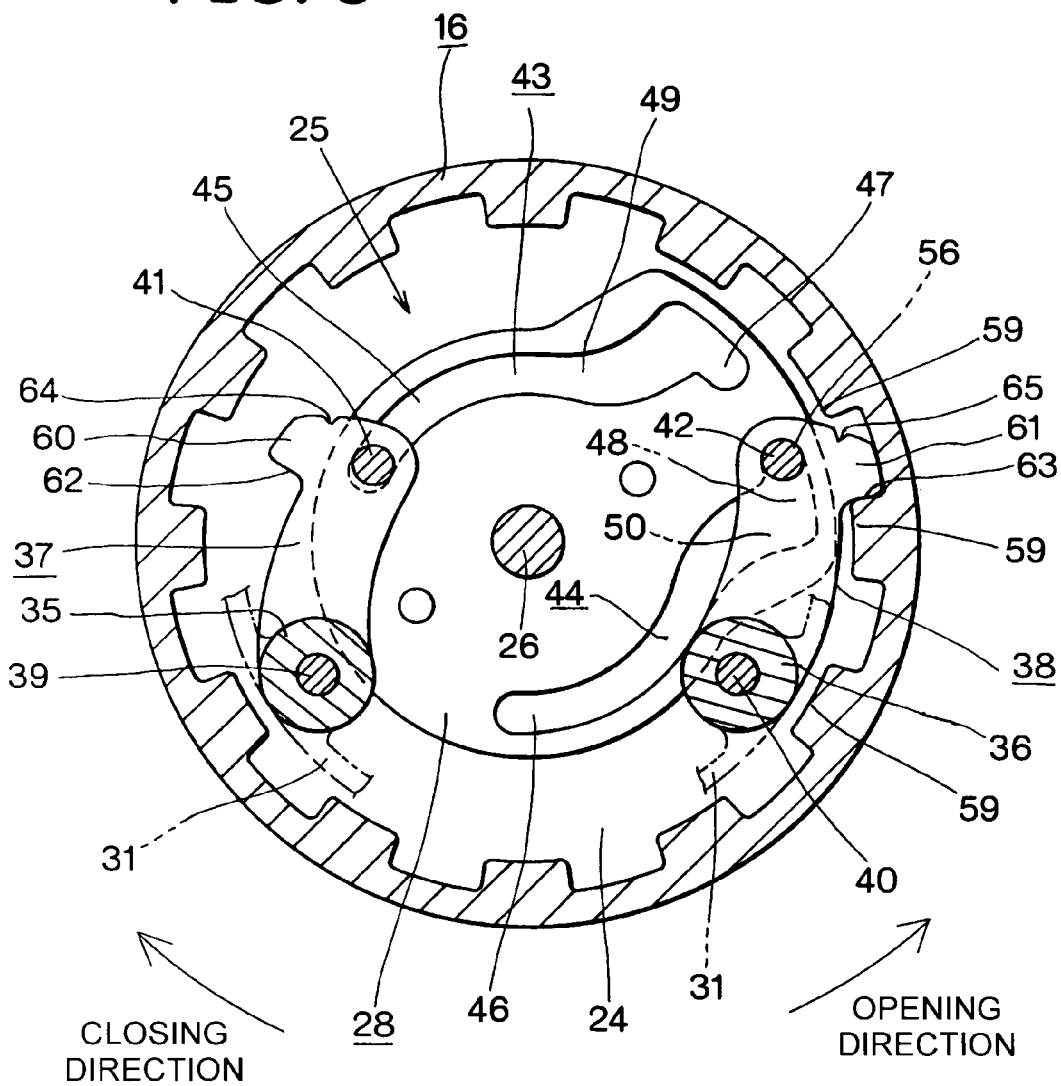
FIG. 6 is a vertical sectional view of a first coupled state of the clutch mechanism.

As will be described later in detail, if the motor 14 rotates in the door-closing direction, for example, the motor plate 28 rotates clockwise in FIG. 4, the one slide pin 42 relatively moves in the guide slot 44 toward the outer slot 48 as shown in FIG. 6, and as a result, the one clutch arm 38 is pushed out in a direction of an arrow A and engaged with the wire drum 16. However, the other slide pin 41 only moves in the guide slot 43 and is not pushed outward and therefore is not engaged with the wire drum 16.

On an inner peripheral face of the wire drum 16, a plurality of projections 59 projecting toward the drum shaft 26 are formed at constant intervals. At the tip ends of the clutch arms 37, 38, clutch pawls 60, 61 projecting in directions apart from the drum shaft 26 are respectively formed. One sides of the clutch pawls 60, 61 are respectively formed into coupling faces 62, 63 substantially parallel with a radial direction of the drum shaft 26. On the other sides of the clutch pawls 60, 61, brake dents 64, 65 are respectively formed.

Figure 13:
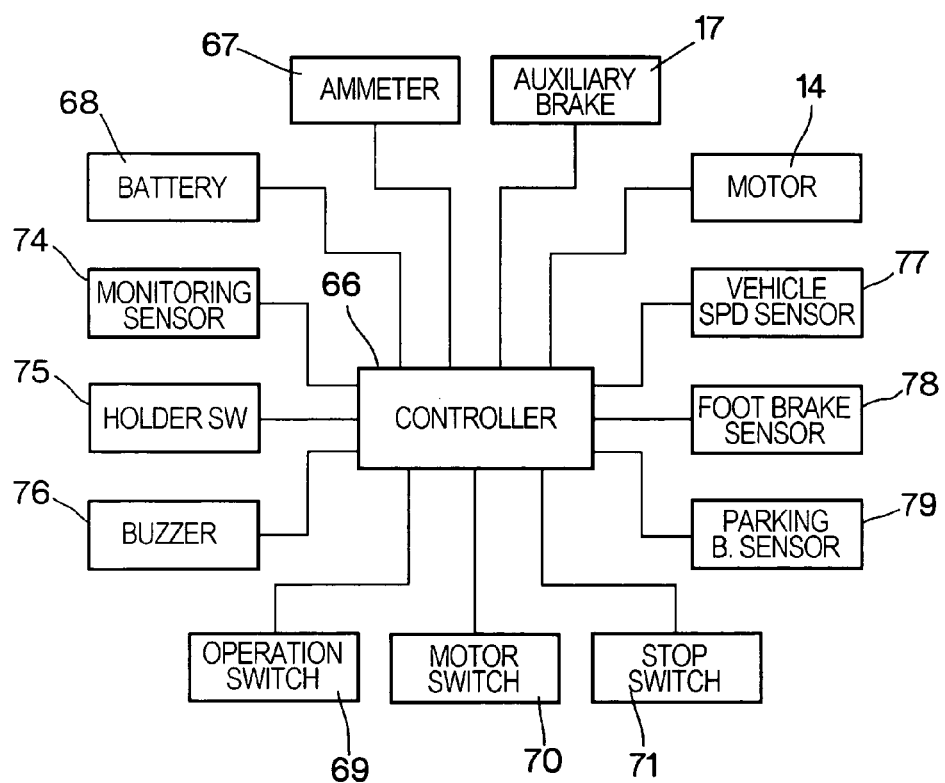
FIG. 13 is a block circuit diagram for carrying out a control operation of the invention.

FIG. 13 is a block circuit diagram for performing a control operation in accordance with the present invention. The block circuit has a controller 66, an ammeter or a load detector 67 to measure electric current flowing through the motor 14, a battery 68 mounted on the vehicle body 13, an operation switch 69, a motor switch 70, a stop switch 71, a monitoring sensor 74, a holder switch 75, a buzzer 76, a vehicle speed sensor 77, a foot brake sensor 78, and a parking brake sensor 79.

The operation switch 69 has an open position for rotating the motor 14 in the door-opening direction, a close position for rotating the motor 14 in the door-closing direction, and a neutral position. When the operation switch 69 is pushed, the controller 66 slides the sliding door 11 toward the closed position or the open position by the motive power of the motor 14.

The motor switch 70 is preferably arranged in the vicinity of a driver's seat of the vehicle body 13 and has an open position for rotating the motor 14 in the opening direction, a close position for rotating the motor 14 in the closing direction, and a neutral position. When the motor switch 70 is operated, the powered sliding device 10 is activated, and when the motor switch 70 is turned off, the powered sliding device 10 is stopped. Accordingly, it is possible to stop the sliding door 11 at a desired semi-open position between the closed position and the open position by the operation of the motor switch 70. This is convenient in the case that a user does not wish to open the sliding door 11 widely due to strong wind and/or strong rain.

The stop switch 71 is preferably arranged in the vicinity of the motor switch 70 and used in the case of stopping the sliding door 11, which is slid under the control by the controller 66, at the semi-open position.

The monitoring sensor 74 detects a sliding amount, a sliding speed, and a sliding direction of the sliding door 11. The monitoring sensor 74 is preferably formed of a pair of optical sensors having light-emitting portions and light-receiving portions and a slit plate for rotating in synchronization with the wire drum 16. The monitoring sensor 74 monitors the sliding amount (sliding position) of the sliding door 11 by measuring a rotation amount of the slit plate by the optical sensor, monitors the sliding speed of the sliding door 11 by measuring a rotation speed of the slit plate, and monitors the sliding direction of the sliding door 11 by measuring a rotating direction of the slit plate.

The holder switch 75 is turned off when the sliding door 11 is retained in the open position by the door holder 73 and is turned on when the sliding door 11 climbs over the door holder 73 and moves in the closing direction. An exact position where the holder switch 75 is switched is a design matter. In the embodiment, when sliding door 11 comes into contact with the door holder 73 by sliding in the opening direction, the holder switch 75 is switched from ON to OFF.

OPERATION

[Uncoupled State of Clutch Mechanism 25]

As shown in FIG. 4, when both slide pins 41, 42 of the clutch arms 37, 38 pivoted to the boss portions 35, 36 of the clutch plate 31 by arm shafts 39, 40 are engaged with the inner slots 45, 46 formed at a constant distance from the drum shaft 26, the clutch pawls 60, 61 of the clutch arms 37, 38 are both separated from the projections 59 of the wire drum 16. This state is the uncoupled state of the clutch mechanism 25, and in this state, the sliding door 11 can be moved by manual operation in the opening direction or in the closing direction without rotating the motor 14, because the rotation of the wire drum 16 in any direction is not transmitted to the clutch pawls 60, 61 (the motor 14).

[Coupled State of Clutch Mechanism 25]

In the uncoupled state in FIG. 4, if the motor 14 is rotated in the closing direction, the motor plate 28 is also rotated in the closing direction. At this time, since a rotational resistance is applied to the clutch plate 31 by the elasticity of the spring 34, the clutch plate 31 and the clutch arms 37, 38 attached to the plate 31 are not rotated for a while. Therefore, the slide pins 41, 42 of the clutch arms 37, 38 relatively move in the guide slots 43, 44 of the motor plate 28, and the slide pin 42 enters the communication slot 50 from the inner slot 46 of the guide slot 44, and the slide pin 42 is then guided by the inside wall 52 of the communication slot 50 to be gradually separated from the drum shaft 26, and thereby the clutch arm 38 is swung in the direction of the arrow A around the arm shaft 40. When the slide pin 42 reaches the outer slot 48 from the communication slot 50, the clutch pawl 61 of the clutch arm 38 projects outward to the utmost to enter a gap Y between projections 59 and 59, and the slide pin 42 is then engaged with the engaging portion 56 of the outer slot 48. During that moment, the other slide pin 41 merely moves in the circular arc inner slot 45 around the drum shaft 26, and accordingly, the other clutch arm 37 does not move in the direction of the arrow A.

When the slide pin 42 has been engaged with the engaging portion 56 of the outer slot 48, the closing rotation of the motor plate 28 is transmitted to the clutch arm 38 via the slide pin 42, the clutch arm 38 and the clutch plate 31 rotate about the drum shaft 26 in the closing direction, and then, as shown in FIG. 6, the coupling face 63 of the clutch pawl 61 is brought into contact with the projection 59 of the wire drum 16 to rotate the drum 16 in the closing direction. As a result, the wire drum 16 slides the sliding door 11 in the closing direction through the wire cables 18 and 19. This state where the coupling face 63 of the clutch pawl 61 is engaged with the projection 59 is the first coupled state of the clutch mechanism 25.

Figure 7:
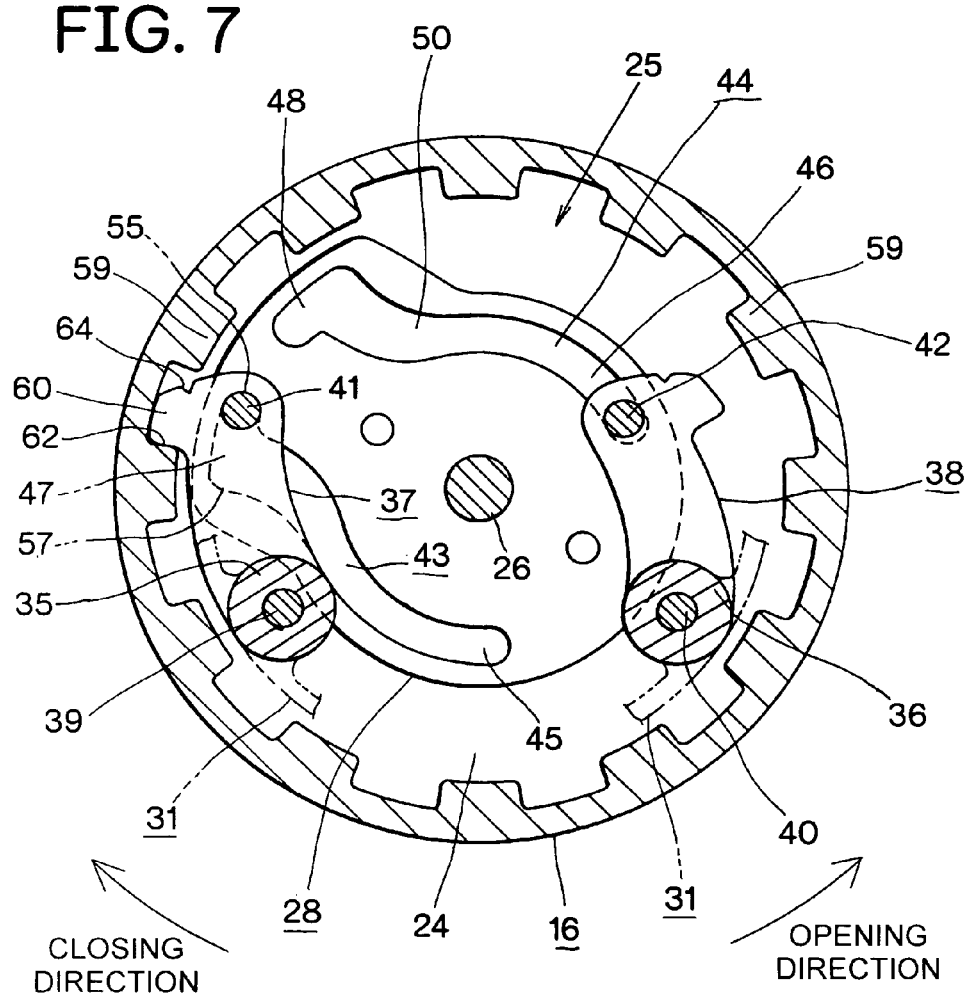
FIG. 7 is a vertical sectional view of a second coupled state of the clutch mechanism.

In FIG. 4, when the motor plate 28 is rotated in the opening direction by the opening rotation of the motor 14, the other clutch arm 37 is swung in the direction of the arrow A, and then, as shown in FIG. 7, the coupling face 62 of the other clutch pawl 60 is engaged with the projection 59 so as to rotate the wire drum 16 in the opening direction. This state where the coupling face 62 of the other clutch pawl 60 is engaged with the projection 59 is the second coupled state of the clutch mechanism 25.

[Brake State of Clutch Mechanism 25]

When an external force in a direction of accelerating the sliding door 11 is applied to the door 11 which is being slid by the motive power of the motor 14, the sliding door 11 intends to slide at an over speed exceeding a predetermined speed set by the motor 14 and the reduction mechanism 15. Almost all of such the external force is applied to the sliding door 11 due to the inclination of the vehicle body 13. This external force is transmitted to the wire drum 16 via the wire cables 18 and 19.

Figure 8:
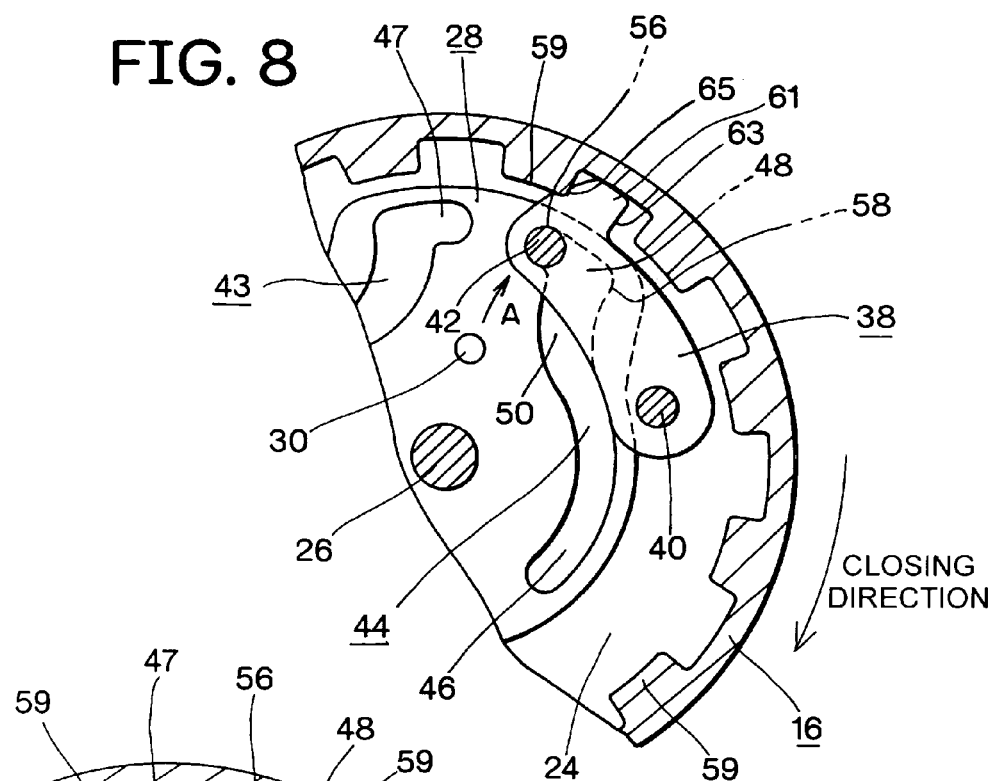
FIG. 8 is a vertical sectional view of a state in which a wire drum is rotated in a closing direction in the first coupled state in FIG. 6.

For example, when the clutch mechanism 25 is in the first coupled state (FIG. 6) for sliding the sliding door 11 in the closing direction, if the external door-accelerating force is applied to the sliding door 11, the wire drum 16 is rotated in the closing direction by the external door-accelerating force at a speed higher than that of the motor plate 28 which is rotated in the closing direction at the predetermined speed by the motive power of the motor 14. Then, as shown in FIG. 8, another projection 59 of the wire drum 16 catches up with the clutch pawl 61 and comes into contact with the brake dent 65, and rotates the clutch arm 38 and clutch plate 31 in the closing direction about the drum shaft 26 at the over speed, thereby the slide pin 42 of the clutch arm 38 is pushed out of the engaging portion 56 of the outer slot 48 and is moved in the outer slot 48 to come into contact with the contact face 58 of the outer slot 48 as shown in FIG. 9.

Figure 9:
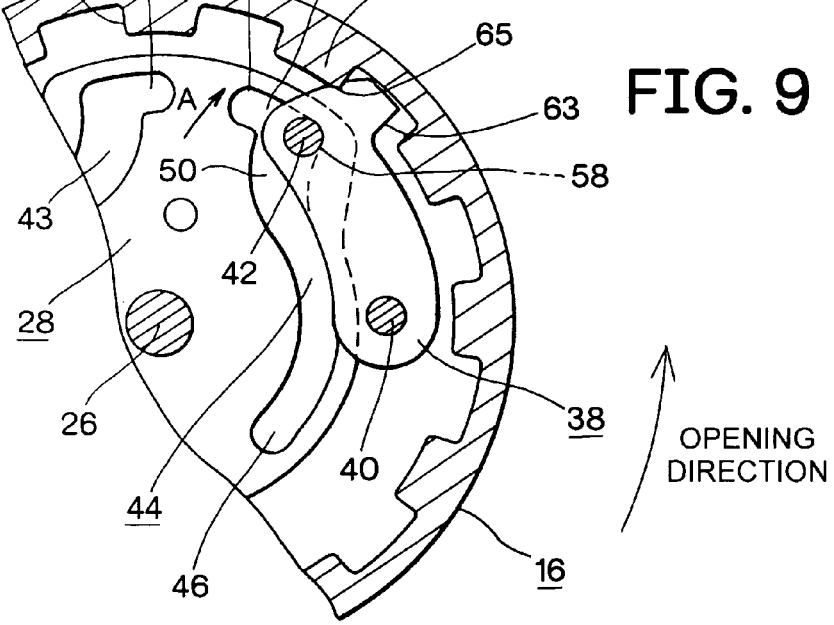
FIG. 9 is a vertical sectional view of a first brake state of the clutch mechanism.

When the slide pin 42 comes into contact with the contact face 58 of the outer slot 48 as shown in FIG. 9, the external door-accelerating force is transmitted to the motor plate 28 through the slide pin 42. However, since the motor plate 28 is connected to the motor 14 through the reduction mechanism 15, the plate 28 cannot be rotated at a speed exceeding the predetermined speed. Accordingly, a braking resistance by the motor plate 28 (reduction mechanism 15) is applied to the wire drum 16 (sliding door 11) and then, the sliding door 11 slides at the predetermined speed similarly to the motor plate 28. The state where the projection 59 is engaged with the brake dent 65 to restrict the over speed of the sliding door 11 in the closing direction is the first brake state of the clutch mechanism 25.

Similarly, if the clutch mechanism 25 is in the second coupled state (FIG. 7) for sliding the sliding door 11 in the opening direction, when the external door-accelerating force is applied to the sliding door 11, the projection 59 is engaged with the brake dent 64 of the clutch arm 37 as shown in FIG. 10 to keep the speed of the sliding door 11 at the predetermined speed. This state is the second brake state of the clutch mechanism 25.

[Restoration to Uncoupled State from Coupled State by Motor 14]

The clutch mechanism 25 can be restored to the uncoupled state from the coupled state by rotating the motor 14 in the reverse direction for a predetermined time or by a predetermined amount.

When the clutch mechanism 25 is in the first coupled state shown in FIG. 6 by the closing rotation of the motor 14, the motor 14 is rotated reversely so as to rotate the motor plate 28 in the opening direction. As a result, the slide pin 42 of the clutch arm 38 is separated from the engaging portion 56 of the outer slot 48 to relatively move in the outer slot 48 and comes into contact with the contact face 58 of the outer slot 48 as shown in FIG. 11. Then, if the motor plate 28 further rotates in the opening direction, because the brake dent 65 is not engaged with the projection 59, the slide pin 42 is pushed in an opposite direction to the direction of the arrow A by the contact face 58 with which the pin 42 is in contact. If the motor 14 reversely rotates by a predetermined amount, the slide pin 42 is returned to the inner slot 46 through the communication slot 50 and the clutch mechanism 25 is restored to the uncoupled state as shown in FIG. 4.

The restoration to the uncoupled state from the second coupled state of the clutch mechanism 25 is also performed on the basis of the same principle.

In principle, the controller 66 performs a restoring operation for reversing the motor 14 by the predetermined amount to restore the clutch mechanism 25 to the uncoupled state so as to finish sliding of the sliding door 11 by the motor 14.

[Restoration to Uncoupled State from Brake State by Motor 14]

In order to restore the clutch mechanism 25 from the brake state to the uncoupled state by the motor 14, the clutch mechanism 25 is first restored from the brake state to the coupled state and then is restored from the coupled state to the uncoupled state.

When the external door-accelerating force is applied to the sliding door 11 during sliding of the sliding door 11 in the closing direction by the first coupled state (FIG. 6) of the clutch mechanism 25, the clutch mechanism 25 is shifted to the first brake state as shown in FIG. 9. It is unnecessary that the controller 66 judges whether the clutch mechanism 25 is in the first coupled state or in the first brake state to restore the clutch mechanism 25 to the uncoupled state. The controller 66 first reversely rotates the motor 14 in the opening direction by the predetermined amount in any state. If the clutch mechanism 25 is in the first coupled state, the clutch mechanism 25 is restored to the uncoupled state, as described above, by the reverse rotation of the motor 14 by the predetermined amount. During this time, because the clutch mechanism 25 is merely restored from the first coupled state to the uncoupled state and does not rotate the wire drum 16, a load for rotating the wire drum 16 is not applied on the motor 14 and therefore no load of the motor 14 is detected by the ammeter 67. When the reverse rotation of the motor 14 is completed without the detection of the load of the motor 14 as described above, the controller 66 perceives that the clutch mechanism 25 was in the first coupled state and can finish the restoring operation.

If the motor 14 is reversely rotated in the opening direction by the restoring operation by the controller 66 while the clutch mechanism 25 is in the first brake state (FIG. 9), the opening rotation of the motor plate 28 is immediately transmitted to the wire drum 16 through engagement of the brake dent 65 and the projection 59 with each other, and consequently, the load of the motor 14 is detected by the ammeter 67 before the reverse rotation by the predetermined amount of the motor 14 is completed. When the load of the motor 14 is detected as a result of the reverse rotation of the motor 14 in this manner, the controller 66 can perceive that the clutch mechanism 25 is in the first brake state and the controller 66 immediately rotates the motor 14 in the closing direction. As a result, the motor plate 28 rotates in the closing direction, the engaging portion 56 of the outer slot 48 is engaged with the slide pin 42 as shown in FIG. 8, and the clutch arm 38 is rotated around the drum shaft 26 in the closing direction. After that, the coupling face 63 of the clutch pawl 61 is brought into contact with the projection 59 and the clutch mechanism 25 is shifted to the first coupled state shown in FIG. 6. When the clutch mechanism 25 is displaced to the first coupled state, the load for rotating the wire drum 16 is applied on the motor 14 and this load is detected by the ammeter 67. This detection of the load enables the controller 66 to detect the shift of the clutch mechanism 25 to the first coupled state from the first brake state, and therefore the controller 66 rotates the motor 14 in the opening direction by the predetermined amount to thereby restore the clutch mechanism 25 to the uncoupled state, as described above. By repeatedly changing the rotating direction of the motor 14 in this manner, the clutch mechanism 25 is restored to the uncoupled state from the first brake state via the first coupled state by the motive power of the motor 14.

The restoration to the uncoupled state from the second brake state (FIG. 10) of the clutch mechanism 25 is also performed on the basis of the same principle.

[Restoration to Uncoupled State from Brake State by Manual Operation]

The clutch mechanism 25 can be restored from the brake state to the uncoupled state by the manual operation even when the motor 14 is in trouble.

Figure 12:
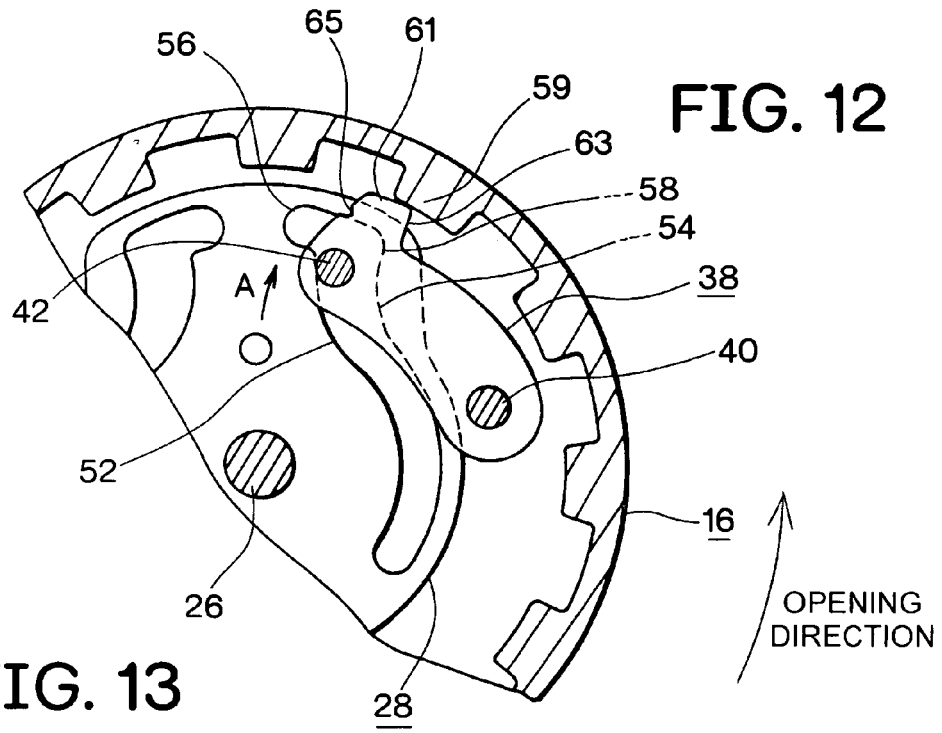
FIG. 12 is a vertical sectional view of a state in which the wire drum is further rotated in the opening direction from the state in FIG. 11 to bring the clutch mechanism into the uncoupled state.

In the first brake state of the clutch mechanism 25 (FIG. 9), when the motor 14 breaks down, the wire drum 16 cannot be rotated in the closing direction by the contact of the slide pin 42 of the clutch arm 38 and the contact face 58 of the motor plate 28 with each other. However, the wire drum 16 can be rotated in the opening direction. Therefore, the sliding door 11 is slid in the opening direction by the manual operation so as to rotate the wire drum 16 in the opening direction through the wire cables 18 and 19 in FIG. 9. Then, the projection 59 is separated from the brake dent 65, and another projection 59 is brought into contact with the coupling face 63, as shown in FIG. 11, to rotate the clutch arm 38 about the arm shaft 40 in the opposite direction of the arrow A, thereby, as shown in FIG. 12, the clutch pawl 61 moves back to a disengaged position with respect to the wire drum 16. In this state, the slide pin 42 is not engaged with the inner slot 46, neither the closing rotation nor the opening rotation of the wire drum 16 is transmitted to the motor 14 (reduction mechanism 15) and therefore this state is also included in the uncoupled state of the clutch mechanism 25.

The restoration to the uncoupled state from the second brake state (FIG. 10) of the clutch mechanism 25 is also performed on the basis of the same principle.

[Restoration to Uncoupled State from Coupled State by Manual Operation]

The clutch mechanism 25 can be restored from the coupled state to the uncoupled state via the brake state by the manual operation even when the motor 14 is in trouble.

In the first coupled state (FIG. 6) of the clutch mechanism 25, when the motor 14 breaks down, the wire drum 16 cannot be rotated in the opening direction by the engagement of the slide pin 42 of the clutch arm 38 and the engaging portion 56 of the motor plate 28 with each other. However, the wire drum 16 can be rotated in the closing direction. Therefore, if the sliding door 11 is slid in the closing direction by the manual operation, the wire drum 16 is rotated in the closing direction through the wire cables 18 and 19 and the clutch mechanism 25 is shifted to the first brake state shown in FIG. 9 via the state shown in FIG. 8.

When the clutch mechanism 25 is shifted to the first brake state, the sliding door 11 cannot be moved because of the contact of the slide pin 42 and the contact face 58 of the motor plate 28 with each other. Therefore, the sliding door 11 is slid in the opening direction by the manual operation. As a result, the clutch mechanism 25 is restored to the uncoupled state from the first brake state as described above. The restoration to the uncoupled state from the second coupled state of the clutch mechanism 25 is also performed on the basis of the same principle.

[Door-opening Cancellation Operation]

The stop switch 71 is operated in the case of stopping, at a desired semi-open position, the sliding door 11 which is being slid by the opening rotation of the motor 14. At this time, the clutch mechanism 25 is held in the second coupled state shown in FIG. 7 when the vehicle body 13 is in a horizontal state, a nose-down inclined state, or a gentle nose-up inclined state where no strong external door-accelerating force is applied to the sliding door 11 and the clutch mechanism 25 is held in the second brake state shown in FIG. 10 when the vehicle body 13 is in a steep nose-up inclined state where the strong external door-accelerating force is applied to the sliding door 11.

Figure 14:
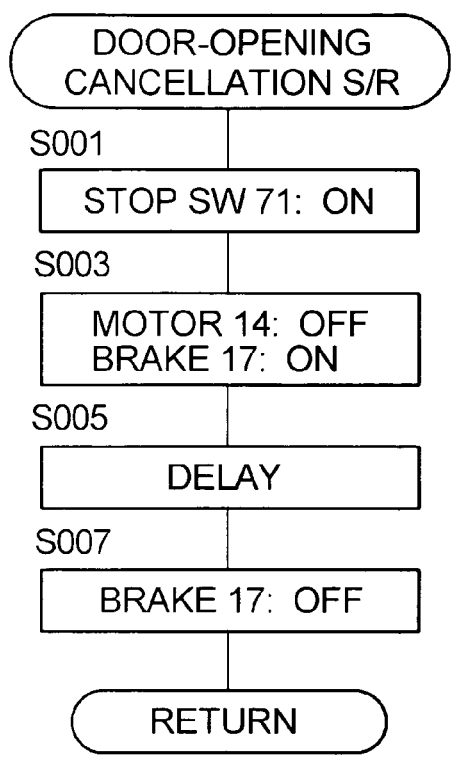
FIG. 14 is a flow chart showing a subroutine of a door-opening cancellation operation.

If the stop switch 71 is operated, as shown in FIG. 14, the controller 66 stops the motor 14 and actuates the auxiliary brake 17 (S003). At a point of time when the motor 14 stops, the inertial force in the opening direction remains in the sliding door 11 irrespective of the inclined state of the vehicle body 13. However, since the auxiliary brake 17 restrains the rotation of the wire drum 16, the wire drum 16 is not rotated excessively by the inertial force of the sliding door 11. When the inertia of the sliding door 11 evanishes due to the elapse of a predetermined time (S005), the controller 66 stops the actuation of the auxiliary brake 17 (S007) without returning the clutch mechanism 25 to the uncoupled state, and terminates the control.

Immediately after the termination of the control by the controller 66, the clutch mechanism 25 is in the same state as that during sliding movement of the sliding door 11 by the motive power of the motor 14. If the vehicle body 13 is in the steep nose-up state, the clutch mechanism 25 is brought into the second brake state (FIG. 10). In this state, although strong gravity in the opening direction is applied to the sliding door 11 due to the steep nose-up inclination of the vehicle body 13, the sliding door 11 is held at the predetermined semi-open position due to the function of the clutch mechanism 25 in spite of the steep nose-up inclined state of the vehicle body 13, because the second brake state of the clutch mechanism 25 can immediately transmit the opening rotation of the wire drum 16 to the motor plate 28.

On the contrary, when the control by the controller 66 is terminated as the clutch mechanism 25 is in the second coupled state, the vehicle body 13 is in any state of the horizontal state, the nose-down state, or the gentle nose-up state. If the vehicle body 13 is in the horizontal state, no gravity in the opening direction or the closing direction is applied to the sliding door 11 and therefore, the door 11 is held at the predetermined semi-open position. If the vehicle body 13 is in the nose-down state, gravity in the closing direction is applied to the sliding door 11. However, since the second coupled state can immediately transmit the closing rotation of the wire drum 16 to the motor 14, the sliding door 11 is held at the predetermined semi-open position due to the function of the clutch mechanism 25 even when the vehicle body 13 is in the nose-down inclined state.

On the other hand, if the vehicle body 13 is in the gentle nose-up state, weak gravity in the opening direction is applied to the sliding door 11. Therefore, when the wire drum 16 is released from the auxiliary brake 17 after the termination of the control by the controller 66, the sliding door 11 is slowly slid in the opening direction. However, if the wire drum 16 rotates in the opening direction in the second coupled state (FIG. 7), the clutch mechanism 25 is immediately switched to the second brake state shown in FIG. 10 and, after that, transmits the opening rotation of the wire drum 16 to the motor 14. Therefore, even when the vehicle body 13 is in the gentle-nose up state, the sliding door 11 is held at the predetermined semi-open position by the function of the clutch mechanism 25 after the sliding door 11 merely moves in the opening direction very slightly.

As described above, the sliding door 11 can be held at the semi-open position by the semi-open holding function of the clutch mechanism 25. Because the auxiliary brake 17 is not actuated while the door 11 is held at the semi-open position in this manner, it is possible to slide the sliding door 11 from the semi-open position by the manual operation by restoring the clutch mechanism 25 from the coupled state and the brake state to the uncoupled state by the already described manual operation.

In the embodiment, as described above, the rotation of the wire drum 16 is restricted by using the auxiliary brake 17 when stopping the sliding door 11 at the semi-open position by the stop switch 71. A reason for this will be explained below. As described above, at a point of time when the motor 14 is stopped by the stop switch 71, the inertial force in the opening direction remains in the sliding door 11 in spite of the inclined state of the vehicle body 13. Therefore, if the wire drum 16 is not restricted by the auxiliary brake 17, the wire drum 16 may be moved in the opening direction due to the inertial force. If such a movement occurs in the second coupled state shown in FIG. 7, the projection 59 of the wire drum 16 may come into contact with the brake dent 64 of the clutch pawl 60 to move the clutch arm 37 in the opening direction to thereby switch the clutch mechanism 25 to the second brake state shown in FIG. 10. Even if the clutch mechanism 25 is switched to the second brake state in this way, normally, this does not involve a problem. However, if the vehicle body 13 is in the nose-down inclined state, the sliding door 11 is slid in the closing direction after the inertia in the opening direction evanishes. Then, because the wire drum 16 is rotated in the closing direction in the second brake state shown in FIG. 10, the clutch mechanism 25 is returned to the uncoupled state and the clutch mechanism 25 loses the semi-open holding function. Therefore, according to the embodiment, an influence of the inertial force on the sliding door 11 is excluded by the auxiliary brake 17.

If the activation and the stop of the motor 14 are controlled by the operation of the motor switch 70 in place of the stop switch 71, the invention provides the same effect.

[Door-closing Cancellation Operation]

In the case of stopping, at a desired semi-open position, the sliding door 11 being slid in the closing direction, as same as the above "Door-Opening Cancellation Operation", the stop switch 71 is also used. However, the control by the controller 66 is slightly different from that in the above "Door-Opening Cancellation Operation". That is, the control is terminated after the controller 66 switches the clutch mechanism 25 into the second coupled state (FIG. 7) for the door-opening direction from the first coupled state (FIG. 6) and the first brake state (FIG. 9) for the door-closing direction. The door-closing cancellation operation will be described below.

During the sliding of the sliding door 11 by the closing rotation of the motor 14, the clutch mechanism 25 is held in the first coupled state shown in FIG. 6 when the vehicle body 13 is in the horizontal state, the nose-up inclined state, or the gentle nose-down inclined state where no strong external door-accelerating force is applied to the sliding door 11, and the clutch mechanism 25 is held in the first brake state shown in FIG. 9 when the vehicle body 13 is in the steep nose-down state where the strong external door-accelerating force is applied to the sliding door 11.

Figure 15:
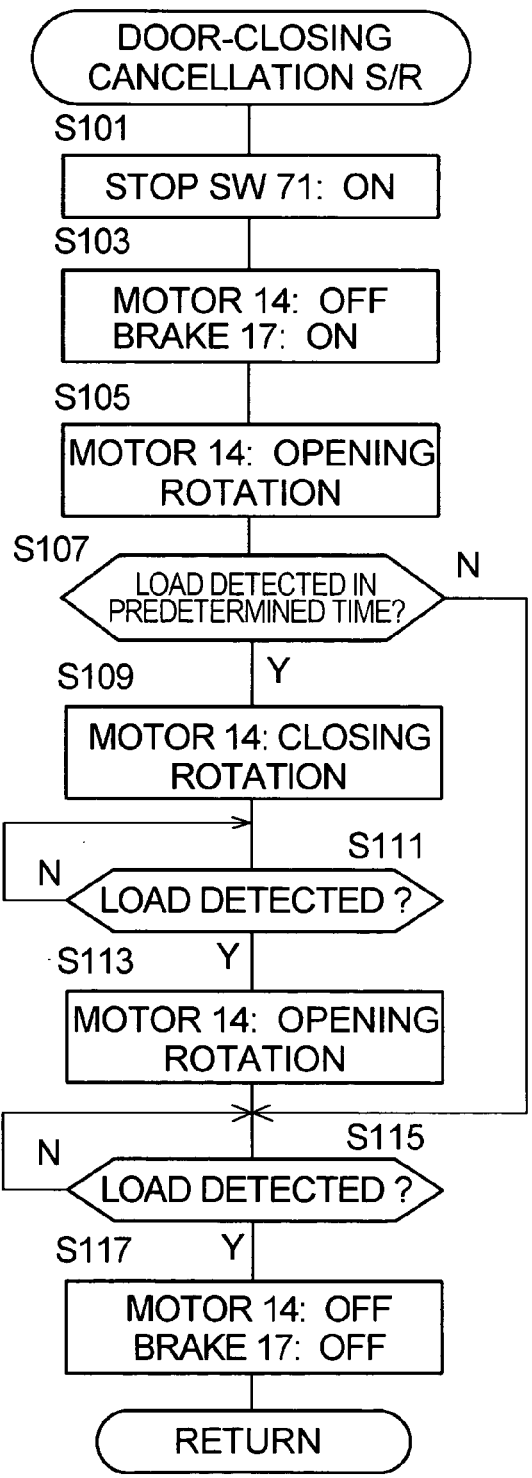
FIG. 15 is a flow chart showing a subroutine of a door-closing cancellation operation.

When the sliding door 11 reaches to the desired semi-open position to operate the stop switch 71, as shown in FIG. 15, the controller 66 stops the motor 14 and actuates the auxiliary brake 17 (S103). At a point of time when the motor 14 stops, the inertial force in the closing direction remains in the sliding door 11 irrespective of the inclined state of the vehicle body 13. However, since the auxiliary brake 17 restrains the rotation of the wire drum 16, the wire drum 16 is not rotated excessively by the inertial force of the sliding door 11. Accordingly, at this time, the clutch mechanism 25 is held in the first coupled state or the first brake state.

Then, the controller 66 reversely rotates the motor 14 in the opening direction as it continues to restrict the rotation of the wire drum 16 by the auxiliary brake 17 (S105). In the case that the clutch mechanism 25 is in the first brake state (FIG. 9), when the motor plate 28 is reversely rotated in the opening direction, the opening rotation of the motor plate 28 is immediately transmitted to the wire drum 16 and the ammeter 67 detects the load of the motor 14 (S107). If the load of the motor 14 has been detected during the predetermined time in this manner, the motor plate 28 is rotated in the closing direction (S109) to switch the clutch mechanism 25 into the first coupled state shown in FIG. 6. Then, because the closing rotation of the motor plate 28 is transmitted to the wire drum 16, the ammeter 67 detects the load of the motor 14 again (S111) and, as a result, the controller 66 rotates the motor 14 in the opening direction (S113). The clutch mechanism 25 is switched to the second coupled state shown in FIG. 7 from the first coupled state through the uncoupled state in FIG. 4 by the opening rotation of the motor 14 at step 113. If the clutch mechanism 25 is switched to the second coupled state, the load of the motor 14 is detected by the ammeter 67 (S115) and therefore the controller 66 stops the motor 14 and stops the actuation of the auxiliary brake 17 (S117) and terminates the control.

At step 105, if the clutch mechanism 25 is in the first coupled state when the controller 66 rotates the motor 14 in the opening direction, a predetermined load is not applied on the motor 14 and the clutch mechanism 25 is switched to the second coupled state shown in FIG. 7 through the uncoupled state in FIG. 4 by the opening rotation of the motor 14. When the clutch mechanism 25 is switched to the second coupled state, the load of the motor 14 is detected by the ammeter 67. Because this load detection is after the predetermined time at step 107 has elapsed, the load is detected at step 115 and, as a result, the motor 14 is stopped, the actuation of the auxiliary brake 17 is stopped (S117), and the controller 66 terminates the control.

As described above, according to the "Door-Closing Cancellation Operation", the controller 66 stops the actuation of the auxiliary brake 17 after switching the clutch mechanism 25 into the second coupled state shown in FIG. 7 irrespective of the inclined state of the vehicle body 13. If the vehicle body 13 is in the nose-down inclined state and gravity in the closing direction is applied to the sliding door 11, the sliding door 11 which has been stopped in the above manner is held at the desired semi-open position by the function of the clutch mechanism 25, because the closing rotation of the wire drum 16 is immediately transmitted to the motor plate 28. On the other hand, if the vehicle body 13 is in the nose-up inclined state, the gravity in the opening direction is applied to the sliding door 11 and, as a result, the sliding door 11 is slowly slid in the opening direction. If the wire drum 16 rotates in the opening direction in the second coupled state, the clutch mechanism 25 is immediately switched to the second brake state shown in FIG. 10 and, after that, the opening rotation of the wire drum 16 is transmitted to the motor 14. Therefore, when the vehicle body 13 is in the nose-down state and the control by the controller 66 has been terminated, the sliding door 11 is held at the desired semi-open position by the function of the clutch mechanism 25 after the sliding door 11 merely moves in the opening direction slightly.

As described above, the sliding door 11 is held at the semi-open position by the function of the clutch mechanism 25. Because the auxiliary brake 17 is not actuated while the door 11 is held at the semi-open position, it is possible to move the sliding door 11 from the semi-open position by the manual operation by restoring the clutch mechanism 25 to the uncoupled state from the coupled state and the brake state by the already described manual operation.

If the activation and the stop of the motor 14 are controlled by the operation of the motor switch 70, the invention provides the same effect.

[Prevention of Unintentional Operation from Semi-open Position]

As described above, in stopping the sliding door 11 at the semi-open position by the operation of the stop switch 71 or the motor switch 70, the controller 66 switches the clutch mechanism 25 to the second coupled state (FIG. 7) or the second brake state (FIG. 10) irrespective of the sliding direction of the sliding door 11. Therefore, even if the sliding door 11 is unintentionally pushed in the opening direction in the nose-down inclined state of the vehicle body 13, the clutch mechanism 25 is not switched to the uncoupled state immediately and it is possible to prevent an accident in which the sliding door 11 is closed rapidly in the nose-down inclined state of the vehicle body 13.

In other words, the sliding door 11 to which strong gravity in the closing direction is applied can be held by the first brake state (FIG. 9) of the clutch mechanism 25. However, if the sliding door 11 is slightly moved in the opening direction by mistake when the sliding door 11 is held in the first brake state, the clutch mechanism 25 is immediately restored to the uncoupled state and therefore there is a danger of rapid sliding of the sliding door 11 in the closing direction in the nose-down inclined state of the vehicle body 13.

However, as described in the "Door-closing Cancellation Operation", according to the invention, the clutch mechanism 25 is switched from the first brake state to the second coupled state (FIG. 7) to bear the strong gravity applied to the sliding door 11 in the closing direction to thereby make a sliding amount of the sliding door 11 in the opening direction and required to restore the clutch mechanism 25 to the uncoupled state greater than that in the case of the first brake state. As a result, the above danger can be reduced.

[Door Closing from Semi-open Position by Motor 14]

Figure 16:
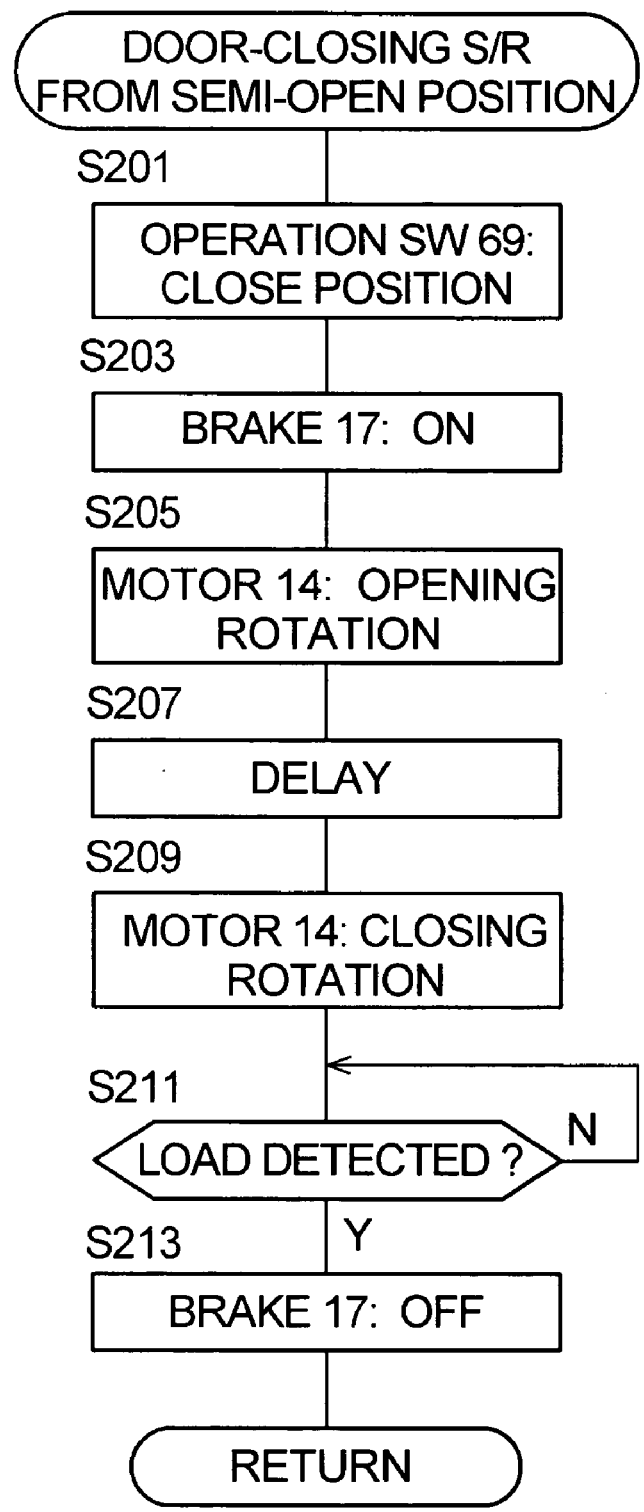
FIG. 16 is a flow chart showing a subroutine for sliding the sliding door from an semi-open position by a motor.

When the operation switch 69 is operated in the closing direction in the state that the sliding door 11 is held at the semi-open position by the second coupled state (FIG. 7) or the second brake state (FIG. 10) of the clutch mechanism 25, the controller 66 actuates the auxiliary brake 17 to restrict the rotation of the wire drum 16 (S203) as shown in FIG. 16 and rotates the motor 14 in the opening direction for a predetermined time (S205). At this time, if the clutch mechanism 25 is in the second coupled state (FIG. 7), the opening rotation of the motor 14 (motor plate 28) is immediately transmitted to the wire drum 16. Because the rotation of the wire drum 16 is restricted by the auxiliary brake 17, the sliding door 11 does not move and the clutch mechanism 25 remains in the second coupled state. On the other hand, if the clutch mechanism 25 is in the second brake state (FIG. 10), the clutch mechanism 25 is switched to the second coupled state by the opening rotation of the motor 14 for the predetermined time. After the clutch mechanism 25 is surely switched to the second coupled state in this manner, the motor 14 is rotated in the closing direction (S209) and the clutch mechanism 25 is switched to the first coupled state (FIG. 6). When the clutch mechanism 25 has been switched to the first coupled state, the ammeter 67 detects the load of the motor 14 (S211) and, as a result, the controller 66 cancels the restriction of the wire drum 16 by the auxiliary brake 17 (S213) to slide the sliding door 11 in the closing direction by the motive power of the motor 14.

The sliding door 11 is slid in the closing direction after restoring the clutch mechanism 25 in the second coupled state or the second brake state to the first coupled state as described above in order to simplify the control for restoring the clutch mechanism 25 to the uncoupled state after the completion of the sliding of the sliding door 11 in the closing direction. For example, when the vehicle body 13 is in the nose-down inclined state and the clutch mechanism 25 is in the second coupled state, if the motor 14 is rotated in the closing direction so as to slide the sliding door 11, the motor plate 28 is rotated in the closing direction in FIG. 7. However, by the nose-down inclination of the vehicle body 13, the external force in the closing direction is applied to the wire drum 16. Therefore, the wire drum 16 is also rotated to follow the closing rotation of the motor plate 28 and the sliding door 11 is slid in the closing direction while the second coupled state of the clutch mechanism 25 is not cancelled. If the clutch mechanism 25 fails to be switched to the first coupled state or the first brake state in spite of the closing rotation of the motor 14, the control operation to cope with this becomes complicated, the number of steps of the control increases, and therefore it takes a long time to restore the clutch mechanism 25 to the uncoupled state. This problem has a great impact particularly in a constitution that the sliding door 11 which has been slid to a half-latch position by a powered sliding device 10 is closed to a full-latch position by a powered closing device (not shown). If it takes a long time to restore the clutch mechanism 25 to the uncoupled state, the operation is not smoothly handed over from the powered sliding device 10 to the powered closing device.

[Inertial Force Absorbing Operation]

If the sliding door 11 slides in the opening direction, climbs over the door holder 73, and reaches the opening end position by the opening operation by the controller 66, the termination of the opening sliding is detected by the monitoring sensor 74 or the ammeter 67 and the controller 66 carries out restoring operation for restoring the clutch mechanism 25 to the uncoupled state while actuating the auxiliary brake 17 to restrict the rotation of the wire drum 16. If the clutch mechanism 25 is restored to the uncoupled state, the controller 66 stops the motor 14, turns the auxiliary brake 17 off, and completes the opening operation.

After the completion of the opening operation, the sliding door 11 is completely free from the powered sliding device 10 and, after that, the sliding door 11 is affected by the external force due to the inclination of the vehicle body 13 or the like. When the vehicle body 13 is in the nose-down inclined state, for example, the external force in the closing direction is applied to the sliding door 11 and therefore the sliding door 11 slides in the closing direction, comes into contact with the door holder 73, and is retained in this position. At this time, if the sliding speed of the sliding door 11 is higher than a set speed, the large inertia in the closing direction is generated in the sliding door 11. If the sliding door 11 having such a large inertial force comes into contact with the door holder 73, the retaining force of the climbing-over retaining door holder 73 gives in to a moving force (the external force+the inertial force) of the sliding door 11 and the sliding door 11 may climb over the door holder 73 in the closing direction.

Figure 17:
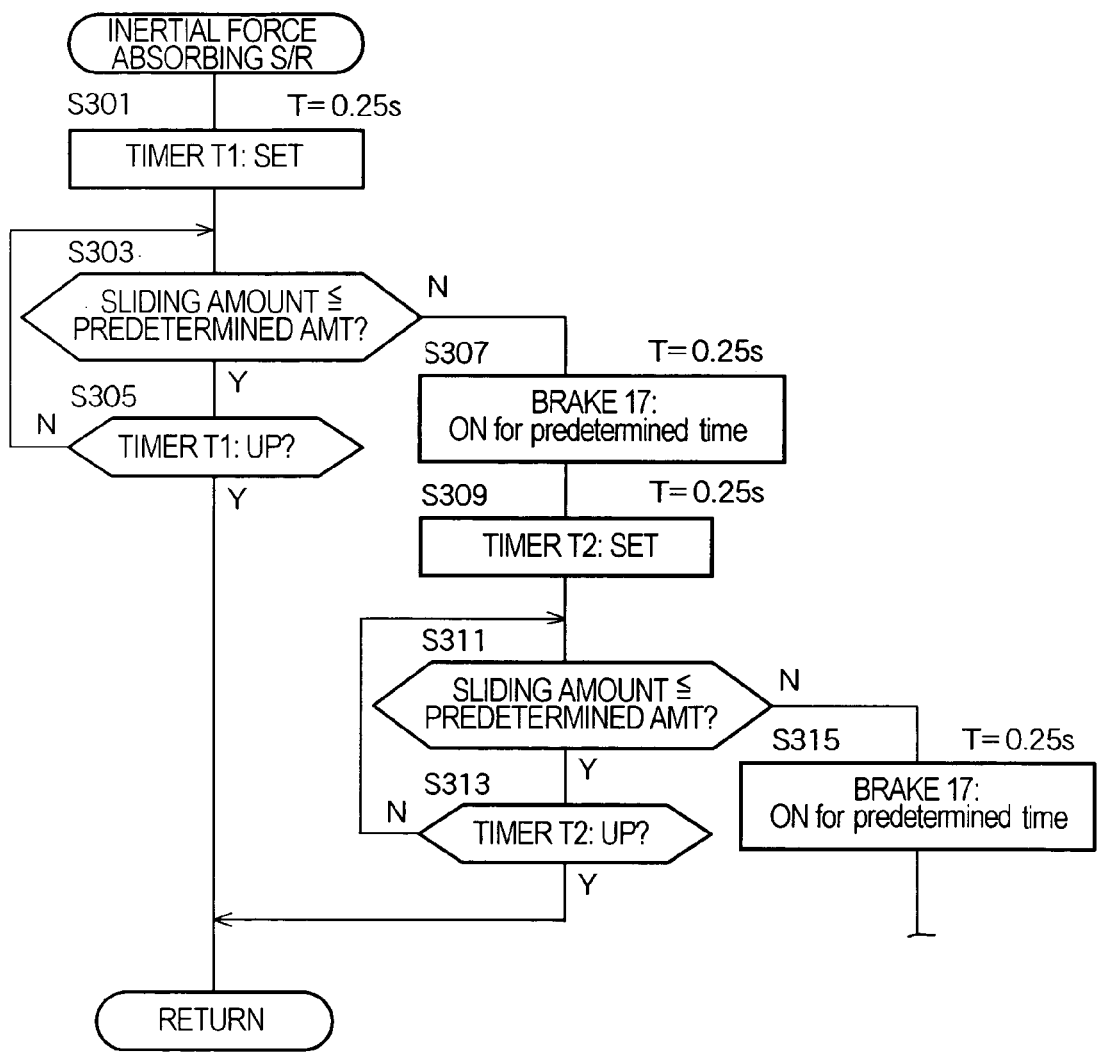
FIG. 17 is a flow chart showing a subroutine of an inertial force absorbing operation.

Therefore, in this invention, when the opening operation has been completed and the sliding door 11 has become free from the powered sliding device 10, the inertial force absorbing operation shown in FIG. 17 is carried out. If there is a fear that the sliding door 11 comes into contact with the door holder 73 while having the large inertial force, a brake is applied to the sliding door 11 to prevent increase in the inertial force of the sliding door 11 and to exclude as much influence of the inertial force on the retaining force of the door holder 73 as possible.

The inertial force absorbing operation will be described below. When the motor 14 stops and the auxiliary brake 17 is turned off due to the completion of the opening operation, a timer T1 is set (S301) and movement of the sliding door 11 is monitored by the monitoring sensor 74 (S303). At this time, if the vehicle body 13 is in the horizontal state or in the nose-up state, the external force in the closing direction is not applied to the sliding door 11 and therefore the sliding door 11 hardly moves. Consequently, the sliding amount of the sliding door 11 does not reach the predetermined amount and the time on the timer T1 is up (S305), which terminates the inertial force absorbing operation.

If the opening operation has been terminated when the vehicle body 13 is in the gentle nose-down state, a weak external force in the closing direction is applied to the sliding door 11 and therefore the sliding door 11 gradually slides in the closing direction. However, because the sliding speed is low, the sliding amount of the sliding door 11 does not reach the predetermined amount and the time on the timer T1 is up (S305). The inertial force absorbing operation is terminated before the sliding door 11 comes into contact with the door holder 73 without applying the brake to the sliding door 11 once. The sliding door 11 keeps free-sliding in the closing direction at a low speed and then comes into contact with the door holder 73 and is retained in the open position.

On the other hand, if the opening operation has been terminated when the vehicle body 13 is in the steep nose-down state, a strong external force in the closing direction is applied to the sliding door 11. As a result, the sliding door 11 slides in the closing direction at a higher speed than the set speed and the sliding amount of the sliding door 11 exceeds the predetermined amount before the time on the timer T1 is up (S305). Therefore, at a point of time when the sliding amount exceeds the predetermined amount, the auxiliary brake 17 is turned on for a predetermined time to reduce a speed of and stop the sliding door 11 to thereby absorb the inertial force and then, the restriction of the sliding of the sliding door 11 is cancelled again (S307). If the auxiliary brake 17 is turned off, the sliding door 11 slides in the closing direction again due to the external force caused by the inclination. Therefore, a timer T2 is set (S309) and the movement of the sliding door 11 is monitored by the monitoring sensor 74 (S311). If a time on the timer T2 is up (S313) without reaching of the predetermined amount by the sliding amount of the sliding door 11, the inertial absorbing operation is terminated. If the sliding amount exceeds the predetermined amount, the auxiliary brake 17 is turned on again for the predetermined time to reduce the speed of and stop the sliding door 11 to thereby absorb the inertial force. Then, the restriction of the sliding of the sliding door 11 is cancelled again (S315). After that, the similar operation is repeated and the sliding door 11 is brought into contact with the door holder 73 while controlling the sliding speed of the sliding door 11 in the closing direction by the auxiliary brake 17 as necessary. As a result, the inertial force of the sliding door 11 which adversely affects the set retaining force of the door holder 73 can be restricted to a predetermined or lower strength.

In the above inertial force absorbing operation, the auxiliary brake 17 is actuated only when it is judged that the large inertial force in the closing direction is generated in the sliding door 11. Therefore, the whole control operation is rational and unnecessary restriction of the sliding of the sliding door 11 can be cancelled at an early stage. Moreover, because the restriction on the sliding door 11 can be cancelled early, it is possible to shift to the next operation, e.g., the manual closing operation early.

Here, the predetermined amount at step 311 and repeated similar steps is variable. In other words, the sliding speed (inertial force) when the sliding door 11 comes into contact with the door holder 73 is dependent on a relationship between the sliding speed at a point of time when the time on the corresponding timer is up and a free-sliding distance until the sliding door 11 comes into contact with the door holder 73. The shorter the free-sliding distance, the less the door 11 is accelerated by the external force. Therefore, at step 311 and the repeated similar steps where the free-sliding distance becomes short, the predetermined amount can be increased to correspond to the short free-sliding distance. By making the predetermined amount variable in consideration of the free-sliding distance, the restriction on the sliding door 11 by the auxiliary brake 17 can be cancelled at an earlier stage.

[Application of Opening Termination Operation to Other Powered Sliding Devices]

The above-described inertial force absorbing operation can be applied to other powered sliding devices. For example, in a structure such as a powered sliding device described in Japanese Patent Application Laid-open No. 11-301271 for transmitting motive power of a motor to a wire drum through an electromagnetic clutch, if the electromagnetic clutch is turned on with the motor stopped, resistance caused by a reduction mechanism of the motor acts on the wire drum. Consequently, this electromagnetic clutch has an equal function to the auxiliary brake 17 in the embodiment. Therefore, if the sliding door has moved to the opening end position, the motor is stopped, the electromagnetic clutch is turned off, and then the electromagnetic clutch is turned on as required to control the sliding speed of the sliding door while monitoring the movement of he sliding door. In this manner, the inertial force absorbing operation according to the invention can be carried out.

[Door-closing from Open position by Motor 14]

Figure 18:
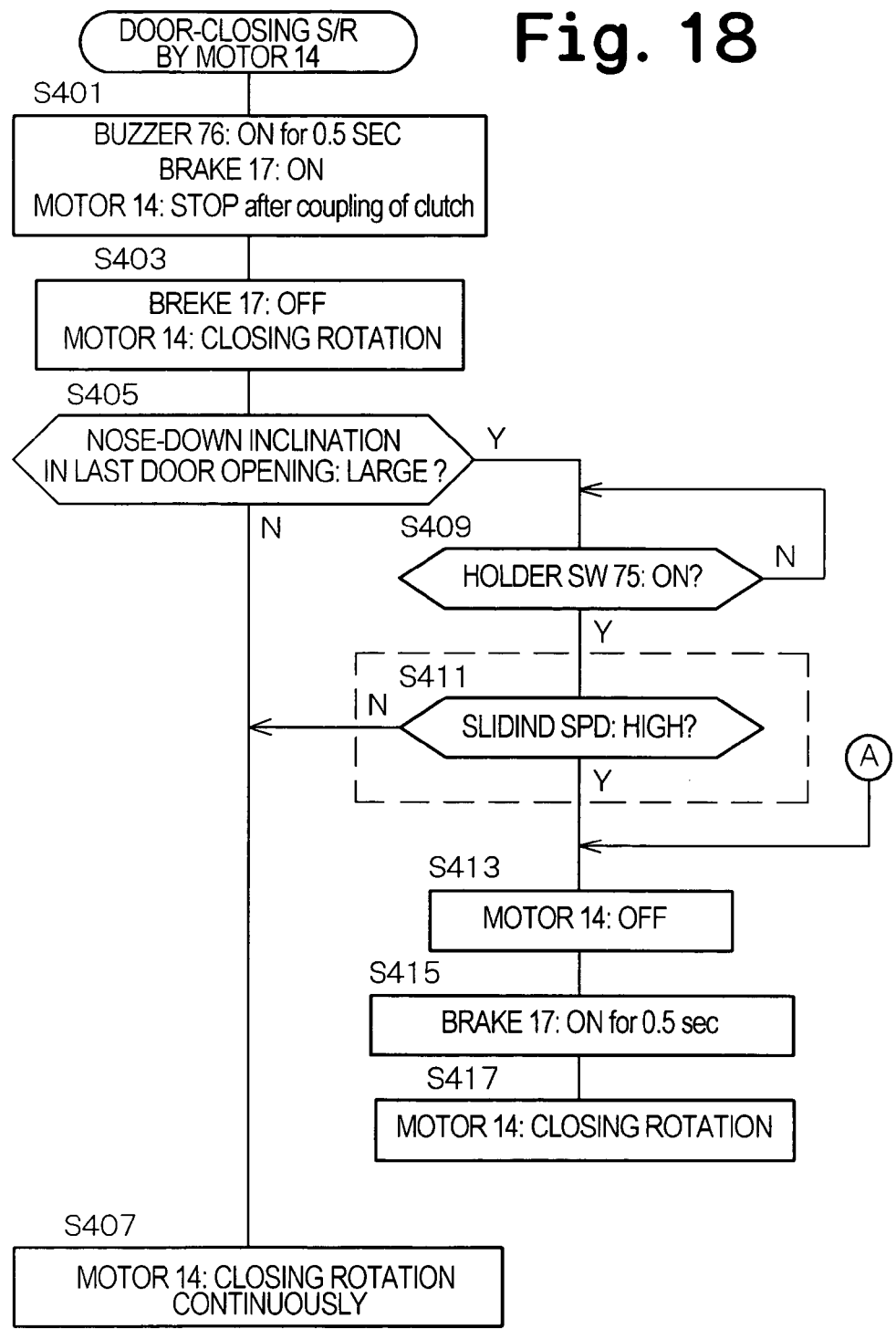
FIG. 18 is a flow chart showing a subroutine of a door-closing operation by the motor.

When the sliding door 11 is in the open position, if the operation switch 69 is operated to the close position, a closing operation in FIG. 18 is carried out. The buzzer 76 is first sounded for 0.5 second and simultaneously the auxiliary brake 17 is turned on to restrain the rotation of the wire drum 16 while rotating the motor 14 in the closing direction to switch the clutch mechanism 25 from the uncoupled state to the first coupled state in FIG. 6. After the switch, the motor 14 is stopped (S401). When the clutch mechanism 25 has been switched to the first coupled state and the buzzer has stopped after the predetermined time, the auxiliary brake is turned off and the motor 14 is rotated in the closing direction to start closing of the sliding door 11 (S403).

By starting of the closing, the sliding door 11 comes into contact with and climbs over the door holder 73. At this time, a degree of inclination of the vehicle body 13 found in the inertial force absorbing operation after the last opening operation is used as feedback data. If the nose-down inclination of the vehicle body 13 is equal to or smaller than a set value, the door closing is continued. If the nose-down inclination of the vehicle body 13 is greater than the set value, the brake is applied by the auxiliary brake 17 to control the movement of the sliding door 11. In other words, in the inertial force absorbing operation in the last door opening, the greater the nose-down inclination of the vehicle body 13, the larger the number of times that the brake is applied by the auxiliary brake 17 tends to become and the shorter the time required to reach the predetermined amount becomes at step 303. The degree of inclination of the vehicle body 13 can be obtained from these data and the motor 14 is kept rotating in the closing direction to close the door if the degree of inclination is equal to or smaller than the set value (S407). If the degree of inclination is greater than the set value, at a point of time when it is found that the door 11 has climbed over the door holder 73 (S409) based on the switch of the holder switch 75 from OFF to ON by sliding movement of the sliding door 11, the motor 14 is stopped temporarily (S413), the auxiliary brake 17 is then actuated for about 0.5 second (S415) to stop the sliding door 11 temporarily, and then the motor 14 is rotated again in the closing direction to restart the door closing (S417). It is also possible to add the sliding speed higher than a predetermined speed at step 411 surrounded with a dotted line as a condition for actuating the auxiliary brake 17.

Thus, the sliding door 11 is stopped temporarily in the closing operation of the sliding door 11 by the motor 14 when the nose-down inclination of the vehicle body 13 is greater than the set value. However, the sliding speed of the sliding door 11 is rapidly stabilized after the restart of the door closing and therefore the whole movement feels smooth in spite of the temporary stop.

[Door-closing Operation from Open Position by External Force]

Figure 19:
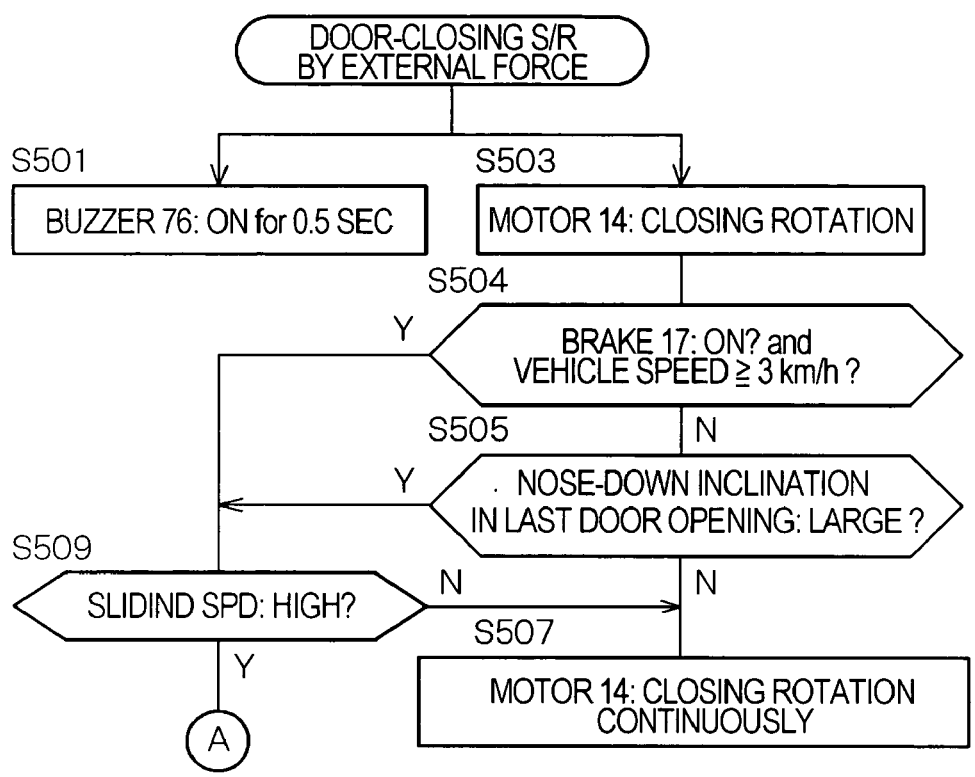
FIG. 19 is a flow chart showing a subroutine of a door-closing operation by an external force.

When the sliding door 11 is in the open position, if the sliding door 11 is slid in the closing direction by the external force such as manual power and comes into contact with and climbs over the door holder 73 to switch the holder switch 75 from OFF to ON, the controller 66 carries out a door-closing operation by the external force shown in FIG. 19 while simultaneously sounding the buzzer 76 for 0.5 second (S501) and rotating the motor 14 in the closing direction (S503).

Although most of the external force for sliding the sliding door 11 in the closing direction from the open position and over the door holder 73 is applied by the manual operation by the user, such external force is also applied to the sliding door 11 by the braking operation during running of the automobile. Therefore, in order to judge what kind of external force has been applied to the sliding door 11, the controller 66 checks a brake state of the vehicle by using the foot brake sensor 78 and the parking brake sensor 79 when the holder switch 75 has been switched from OFF to ON. When either one of the sensors is ON and the vehicle speed from the vehicle speed sensor 77 is higher than a predetermined speed (about 3 km/h) (S504), there is a fear that the sliding door 11 is rapidly slid in the closing direction by the large inertia in the closing direction. Therefore, the control goes to step 509 where the sliding speed of the sliding door 11 is monitored by the monitoring sensor 74. If the sliding speed is low, the closing rotation of the motor 14 is continued to carry out the door closing (S507). If the sliding speed is high, the control goes to step 413 in FIG. 18 where the motor 14 is stopped temporarily, the auxiliary brake 17 is then actuated for about 0.5 second (S415) to stop the sliding door 11 temporarily, and then the motor 14 is rotated again in the closing direction to restart the door closing (S417). In this manner, the rapid sliding of the door 11 in the closing direction is prevented and the door 11 is closed safely.

If the external force applied to the sliding door 11 is not by the braking operation during running, the control goes from the step 504 to step 505 where the degree of inclination of the vehicle body 13 found in the inertial force absorbing operation after the last door-opening operation is used as the feedback data. If the nose-down inclination of the vehicle body 13 is not greater than the predetermined inclination, the closing rotation of the motor 14 is continued to carry out the door closing (S507). Even when the nose-down inclination of the vehicle body 13 is not greater than the predetermined value, if the user pushes the sliding door 11 strongly, there is a possibility that the sliding door 11 slides at a considerably high speed and that the closing of the sliding door 11 is completed before the clutch mechanism 25 is switched to the first coupled state (to be more precise, the first brake state) by the closing rotation of the motor 14 in some cases. However, little influence is exerted on the sliding door 11 by the external force in the closing direction when the nose-down inclination of the vehicle body 13 is not greater than the predetermined value and the high sliding speed is regarded as a result of the conscious operation by the user. Therefore, the door closing is continued without applying the brake.

On the other hand, if the inclination of the vehicle body 13 is greater than the predetermined value, the control goes from step 505 to step 509 where the sliding speed is monitored by the monitoring sensor 74. If the sliding speed is lower than the predetermined value in spite of the steep inclination of the vehicle body 13, the closing rotation of the motor 14 is continued to carry out the door closing (S507). However, if the sliding speed is high, it is judged that the speed has exceeded the predetermined value due to the steep inclination of the vehicle body 13 and the control goes to step 413 in FIG. 18 where the motor 14 is stopped temporarily. Then, the auxiliary brake 17 is actuated for about 0.5 second (S415) to temporarily stop the sliding door 11 and then, the motor 14 is rotated again in the closing direction to restart the door closing (S417). In this manner, the door is prevented from rapidly sliding in the closing direction against a user's will and the door closing is carried out safely. Here, monitoring of the speed at step 509 is an additional condition set if desired.

In the above operation, the auxiliary brake 17 is actuated only when the door may not be closed safely by the manual operation. Therefore, the user is not restrained from closing the sliding door 11 consciously in haste and the rational control is carried out.

Moreover, even if the sliding door 11 is slid from the open position and climbs over the door holder 73 in the closing direction by mistake by the braking operation during running and the closing rotation of the motor 14 is started, the sliding door 11 is closed at a safe speed.

[Variation of Door-closing Operation from Open Position by External Force]

Although the door closing is continued while preventing the sliding door 11 from sliding at a dangerous speed when it is found that the sliding door 11 has climbed over the door holder 73 from the open position due to the braking operation during running at step 504 in the control in FIG. 19, other control operations which can be carried out at this time will be described. In the first variation, the brake state of the vehicle is checked by the foot brake sensor 78 and the parking brake sensor 79. If either one of the sensors is on and the vehicle speed from the vehicle speed sensor 77 is higher than the predetermined speed (about 3 km/h), the motor 14 is unconditionally turned off and the auxiliary brake 17 is turned on to thereby urgently stop the sliding door 11. In the second variation, the brake state of the vehicle is checked by the foot brake sensor 78 and the parking brake sensor 79. If either one of the sensors is on and the vehicle speed from the vehicle speed sensor 77 is higher than the predetermined speed (about 3 km/h), the motor 14 is unconditionally and reversely rotated in the opening direction to return the sliding door 11 to the open position.

In these variations, safety is further improved when the sliding door 11 is slid from the open position to climb over the door holder 73 in the closing direction by mistake by the braking operation during running.

EFFECTS OF THE INVENTION

In this invention, the auxiliary brake 17 or the electromagnetic clutch is actuated only when it is judged that the large inertial force in the closing direction is generated in the sliding door 11 after the restriction of the sliding movement of the sliding door 11 is cancelled as a result of the completion of the opening operation. Therefore, the whole control operation is rational and unnecessary restriction of the sliding of the sliding door 11 can be cancelled in the early stage.

In this invention, the brake is applied to the sliding door 11 only when there is a fear that the sliding door 11 slides in the closing direction at an undesired speed in closing the sliding door 11 from the open position. Therefore, the door 11 can be closed safely.

In closing the door 11 by the manual operation, if the vehicle body is not inclined steeply, it is possible to close the door consciously at the high sliding speed.

In closing the door 11 by the motor 14, it is possible to prevent jerky movement of the sliding door 11 which occurs in climbing over of the door holder 73.

Furthermore, in this invention, even if the sliding door 11 is slid from the open position to climb over the door holder 73 in the closing direction by mistake by the vehicle braking operation during running, the dangerous sliding of the sliding door 11 in the closing direction can be prevented.

The invention claimed is:

1. A method of controlling a powered sliding device for sliding a vehicle sliding door in an opening direction and a closing direction by motive power of a motor, the sliding door being retained in an open position having a predetermined width in the closing direction from an opening end position by overcoming resistance of a door holder after the sliding door is slid up to the opening end position, said method comprising the steps of;

monitoring a sliding movement of the sliding door in the closing direction by an external force after the sliding door is slid in the opening direction by the motive power of the motor to reach the opening end position and the sliding movement by the motor is terminated;

applying a brake to the sliding door for a predetermined time when the sliding movement of the sliding door in the closing direction at a speed higher than a predetermined speed is detected within a predetermined time; and after that, applying the brake to the sliding door again for a predetermined time when the sliding movement of the sliding door in the closing direction at a speed higher than a predetermined speed is detected again within a predetermined time.

2. A method of controlling a powered sliding device for sliding a vehicle sliding door in an opening direction and a closing direction by motive power of a motor, the sliding door being retained in an open position having a predetermined width in the closing direction from an opening end position by resistance of a door holder after the sliding door is slid up to the opening end position, wherein, when the sliding door is slid in the closing direction from the open position by a manual operation and passes or climbs over the door holder while a nose-down inclination of a vehicle body is greater than a set inclination, the sliding door is moved in the closing direction by the motor after a brake is applied to the sliding door for a predetermined time.

3. The method according to claim 2, wherein the brake is applied to the sliding door when a sliding speed of the sliding door after the sliding door passes or climbs over the door holder is higher than a predetermined speed.

4. A method of controlling a powered sliding device for sliding a vehicle sliding door in an opening direction and a closing direction by motive power of a motor, the sliding door being retained in an open position having a predetermined width in the closing direction from an opening end position by resistance of a door holder after the sliding door is slid up to the opening end position, wherein, when the sliding door is slid in the closing direction from the open position by the motive power of the motor and passes or climbs over the door holder while a nose-down inclination of a vehicle body is greater than a set inclination, the sliding door is moved in the closing direction by the motor after a brake is applied to the sliding door for a predetermined time.

5. The control method according to claim 4, wherein the brake is applied to the sliding door when a sliding speed of the sliding door after the sliding door passes or climbs over the door holder is higher than a predetermined speed.

6. A method of controlling a powered sliding device for sliding a vehicle sliding door in an opening direction and a closing direction by motive power of a motor, the sliding door being retained in an open position having a predetermined width in the closing direction from an opening end position by resistance of a door holder after the sliding door is slid up to the opening end position, wherein when the sliding door is slid in the closing direction from the open position and passes or climbs over the door holder while a foot brake or a parking brake of a vehicle is actuated, a vehicle speed is monitored, and then the sliding door is moved in the closing direction by the motor after a brake is applied to the sliding door for a predetermined time when a vehicle speed higher than a predetermined speed is detected.

7. The control method according to claim 6, wherein the brake is applied to the sliding door when a sliding speed of the sliding door after the sliding door passes or climbs over the door holder is higher than a predetermined speed.

8. A method of controlling a powered sliding device for sliding a vehicle sliding door in an opening direction and a closing direction by motive power of a motor, the sliding door being retained in an open position having a predetermined width in the closing direction from an opening end position by resistance of a door holder after the sliding door is slid up to the opening end position, wherein when the sliding door is slid in the closing direction from the open position and passes or climbs over the door holder while a foot brake or a parking brake of a vehicle is actuated, a vehicle speed is monitored, and then the sliding door is kept in the position by applying a brake to the sliding door when a vehicle speed higher than a predetermined speed is detected.

9. A method of controlling a powered sliding device for sliding a vehicle sliding door in an opening direction and a closing direction by motive power of a motor, the sliding door being retained in an open position having a predetermined width in the closing direction from an opening end position by resistance of a door holder after the sliding door is slid up to the opening end position, wherein when the sliding door is slid in the closing direction from the open position and passes or climbs over the door holder while a foot brake or a parking brake of a vehicle is actuated, a vehicle speed is monitored, and then the sliding door is returned to the open position by the opening rotation of the motor when a vehicle speed higher than a predetermined speed is detected.

* * * * *